LINE CONCENTRATOR SERVICE OBSERVING CIRCUIT

Filed Oct. 4, 1955

INVENTORS M. E. KROM
M. POSIN
BY
ATTORNEY

LINE CONCENTRATOR SERVICE OBSERVING CIRCUIT

Filed Oct. 4, 1955 19 Sheets-Sheet 2

INVENTORS M. E. KROM
M. POSIN
BY
[signature]
ATTORNEY

Sept. 24, 1957 M. E. KROM ET AL 2,807,668

LINE CONCENTRATOR SERVICE OBSERVING CIRCUIT

Filed Oct. 4, 1955 19 Sheets-Sheet 3

INVENTORS M. E. KROM
M. POSIN
BY
[signature]
ATTORNEY

LINE CONCENTRATOR SERVICE OBSERVING CIRCUIT

Filed Oct. 4, 1955 19 Sheets-Sheet 4

INVENTORS M. E. KROM
M. POSIN
BY [signature]
ATTORNEY

Sept. 24, 1957 M. E. KROM ET AL 2,807,668

LINE CONCENTRATOR SERVICE OBSERVING CIRCUIT

Filed Oct. 4, 1955 19 Sheets-Sheet 5

INVENTORS M. E. KROM
M. POSIN
BY [signature]
ATTORNEY

LINE CONCENTRATOR SERVICE OBSERVING CIRCUIT

Filed Oct. 4, 1955 19 Sheets-Sheet 6

INVENTORS: M. E. KROM
M. POSIN
BY
ATTORNEY

LINE CONCENTRATOR SERVICE OBSERVING CIRCUIT

Filed Oct. 4, 1955 19 Sheets-Sheet 7

INVENTORS: M. E. KROM
M. POSIN
BY
[signature]
ATTORNEY

LINE CONCENTRATOR SERVICE OBSERVING CIRCUIT

Filed Oct. 4, 1955 19 Sheets-Sheet 8

INVENTORS M. E. KROM
M. POSIN
BY
[signature]
ATTORNEY

INVENTORS: M. E. KROM
M. POSIN
BY
[signature]
ATTORNEY

INVENTORS M. E. KROM
M. POSIN
BY [signature]
ATTORNEY

LINE CONCENTRATOR SERVICE OBSERVING CIRCUIT

INVENTORS: M. E. KROM
M. POSIN
BY [signature]
ATTORNEY

LINE CONCENTRATOR SERVICE OBSERVING CIRCUIT

Filed Oct. 4, 1955 19 Sheets-Sheet 12

INVENTORS: M. E. KROM
M. POSIN
BY
[signature]
ATTORNEY

INVENTORS: M. E. KROM
M. POSIN
BY
[signature]
ATTORNEY

Sept. 24, 1957 M. E. KROM ET AL 2,807,668

LINE CONCENTRATOR SERVICE OBSERVING CIRCUIT

Filed Oct. 4, 1955 19 Sheets-Sheet 14

INVENTORS: M. E. KROM
M. POSIN
BY
[signature]
ATTORNEY

INVENTORS: M. E. KROM
M. POSIN
BY [signature]
ATTORNEY

Sept. 24, 1957 M. E. KROM ET AL 2,807,668

LINE CONCENTRATOR SERVICE OBSERVING CIRCUIT

Filed Oct. 4, 1955 19 Sheets-Sheet 16

INVENTORS M. E. KROM
M. POSIN
BY
[signature]
ATTORNEY

LINE CONCENTRATOR SERVICE OBSERVING CIRCUIT

Filed Oct. 4, 1955 19 Sheets-Sheet 17

INVENTORS M. E. KROM
M. POSIN
BY Sn Turner
ATTORNEY

LINE CONCENTRATOR SERVICE OBSERVING CIRCUIT

INVENTORS M. E. KROM
M. POSIN
BY [signature]
ATTORNEY

FIG. 20

| SIGNALS FROM CONCENTRATOR TO C. O. | | | | | |
|---|---|---|---|---|---|
| | 4C1 | 4C2 | 4C3 | 4C4 | 4C5 |
| LT0 | + | + | | | |
| LT1 | −+ | | | | |
| LT2 | − | − | | | |
| LT3 | + | − | | | |
| LT4 | − | + | | | |
| LU0 | | | | + | + |
| LU1 | | | −+ | | |
| LU2 | | | − | − | |
| LU3 | | | + | − | |
| LU4 | | | − | + | |
| LU5 | | | + | + | |
| LU6 | | | | −+ | |
| LU7 | | | − | | + |
| LU8 | | | + | | + |
| LU9 | | | | − | + |

FIG. 21

| SIGNALS FROM C. O. TO CONCENTRATOR | | | | | |
|---|---|---|---|---|---|
| LINE NUMBER | 4C1 | 4C2 | 4C3 | 4C4 | CIRCUIT 400 |
| 00 OR 24 | 5A+ | | 5C+ | | E0 OR E3 & U0 |
| 01 OR 25 | 5A+ | | 5C− | | E0 OR E3 & U1 |
| 02 OR 26 | 5A+ | | | 5D+ | E0 OR E3 & U2 |
| 03 OR 27 | 5A+ | | | 5D+ | E0 OR E3 & U3 |
| 04 OR 28 | 5A− | | 5C+ | | E0 OR E3 & U4 |
| 05 OR 29 | 5A− | | 5C− | | E0 OR E3 & U5 |
| 06 OR 30 | 5A− | | | 5D+ | E0 OR E3 & U6 |
| 07 OR 31 | 5A− | | | 5D− | E0 OR E3 & U7 |
| 08 OR 32 | | 5B+ | 5C+ | | E1 OR E4 & U0 |
| 09 OR 33 | | 5B+ | 5C− | | E1 OR E4 & U1 |
| 10 OR 34 | | 5B+ | | 5D+ | E1 OR E4 & U2 |
| 11 OR 35 | | 5B+ | | 5D− | E1 OR E4 & U3 |
| 12 OR 36 | | 5B− | 5C+ | | E1 OR E4 & U4 |
| 13 OR 37 | | 5B− | 5C− | | E1 OR E4 & U5 |
| 14 OR 38 | | 5B− | | 5D+ | E1 OR E4 & U6 |
| 15 OR 39 | | 5B− | | 5D− | E1 OR E4 & U7 |
| 16 OR 40 | 5A+ | 5B+ | | | E2 OR E5 & U0 |
| 17 OR 41 | 5A+ | 5B− | | | E2 OR E5 & U1 |
| 18 OR 42 | | | 5C+ | 5D+ | E2 OR E5 & U2 |
| 19 OR 43 | | | 5C+ | 5D− | E2 OR E5 & U3 |
| 20 OR 44 | 5A− | 5B+ | | | E2 OR E5 & U4 |
| 21 OR 45 | 5A− | 5B− | | | E2 OR E5 & U5 |
| 22 OR 46 | | | 5C− | 5D+ | E2 OR E5 & U6 |
| 23 OR 47 | | | 5C− | 5D− | E2 OR E5 & U7 |

FIG. 22

| | 4C2 | 4C3 | 4C4 | RELAYS |
|---|---|---|---|---|
| 0 | | + | + | 16NT4 16NT7 |
| 1 | −+ | | | 16NT0 16NT1 |
| 2 | − | − | | 16NT0 16NT2 |
| 3 | + | − | | 16NT1 16NT2 |
| 4 | − | + | | 16NT0 16NT4 |
| 5 | + | + | | 16NT1 16NT4 |
| 6 | | −+ | | 16NT2 16NT4 |
| 7 | − | | + | 16NT0 16NT7 |
| 8 | + | | + | 16NT1 16NT7 |
| 9 | | − | + | 16NT2 16NT7 |

INVENTORS M. E. KROM
M. POSIN
BY *[signature]*
ATTORNEY

United States Patent Office 2,807,668

Patented Sept. 24, 1957

2,807,668

LINE CONCENTRATOR SERVICE OBSERVING CIRCUIT

Myron E. Krom, Convent Station, N. J., and Melvin Posin, New York, N. Y., assignors to Bell Telephone Laboratories, Incorporated, New York, N. Y., a corporation of New York Application October 4, 1955, Serial No. 538,335

18 Claims. (Cl. 179—18)

This invention relates to telephone service observation equipment and more particularly to service observing circuits for line concentrator telephone systems.

Occasionally a telephone subscriber will register a complaint or inquiry concerning the nature of the service provided. The substance of complaints embraces almost the entire range of telephone service, and includes such items as wrong numbers, don't answer calls, overcharges and various other occurrences generally based upon some improper use of the calling device, or faulty performance of the telephone line or central office equipment. It becomes necessary, therefore, when a subscriber complains, to determine from an actual observation of the subscriber's line whether poor service is actually being rendered and, if so, to determine the cause. In order for the observation operator to observe, monitor, or supervise the operation of the switching equipment involved in the particular subscriber's line responsive to the origination of a call thereon, the operator must receive an indication of the origination of a call on the line and must be provided with a bridging talking connection across the line. When the subscriber's line terminates at, or is connected directly to, the central office, the provision of such indication and connection is a relatively simple matter. However, in concentrator telephone systems, for example, of the type described in our copending applications Serial No. 538,333 and Serial No. 538,334, filed on even date herewith, the subscriber lines terminate in line concentrators which are each connected by relatively few concentrator trunks to the central office. The central office is therefore not directly in information communication with the subscriber lines due to the interposition of the remote line concentrators.

It is a general object of this invention to provide line observation facilities for subscriber lines in a line concentrator telephone system.

In order to accomplish this and other objects, an indication of the origination of a call on the observed line must be provided to the observation operator. The indication must be provided before the operation of the central office switching equipment which is involved in connecting the subscriber line to the central office through the line concentrator and one of the concentrator trunks. One of the important features of the present invention resides in the provision of means for accomplishing this objective. The means include an observation trunk which is connectable at the line concentrator to any one of the subscriber lines, and which is connected at the central office to an observation control circuit. The observation control circuit functions in conjunction with a common control circuit, also at the central office, to control the line concentrators in establishing a connection between the line to be observed and the observation trunk. The common control circuit is also utilized in establishing connections between the subscriber lines and the concentrator trunks which connect the concentrators to the central office.

When a call is originated on the observed line, an indication thereof is provided over the observation trunk, before signals representing the identity of the calling line are supplied to the central office for initiating the operation of the common control circuit. Such signals are necessary because the central office is not directly in information communication with the subscriber lines, due to the interposition of the line concentrator. The origination indication readies the observation control circuit. The control circuit provides a connection from a service observing jack to the talking trunk which is selected and utilized for the call. When the common control circuit functions to establish a connection at the concentrator between the calling line and a selected one of the concentrator trunks, it also operates the readied observation control circuit. The observation control circuit releases the observation trunk circuit at the concentrator, and establishes a connection in the central office between the selected concentrator trunk and the service observing jack in the observation control circuit.

A feature of the present invention relates to the provision of the service observation connection at the central office from the service observing jack to the selected concentrator trunk while releasing the observation trunk circuit. The observation trunk circuit is released in order to avoid the transmission losses due to bridging the observed line by the observation trunk when a concentrator trunk is connected thereto. The observation trunk is never connected to the observed line at the same time that a concentrator trunk is connected thereto.

Another feature of the present invention resides in the utilization of the concentrator signaling means at the central office for the service observing function. Essentially the same signaling equipment at the central office, and signal receiving, or number group equipment, in the concentrator are utilized for the service observing function and for all types of calls.

A further feature of the present invention is the provision of an observation control circuit which can be utilized for a line terminating at any one of a plurality of line concentrators.

Further objects and features will become apparent to those skilled in the art upon consideration of the following description read in conjunction with the drawing wherein:

Figs. 1 through 16, when arranged in accordance with Fig. 17, are circuit representations of the lines concentrator and service observing equipment of the present invention wherein:

Figure 18:
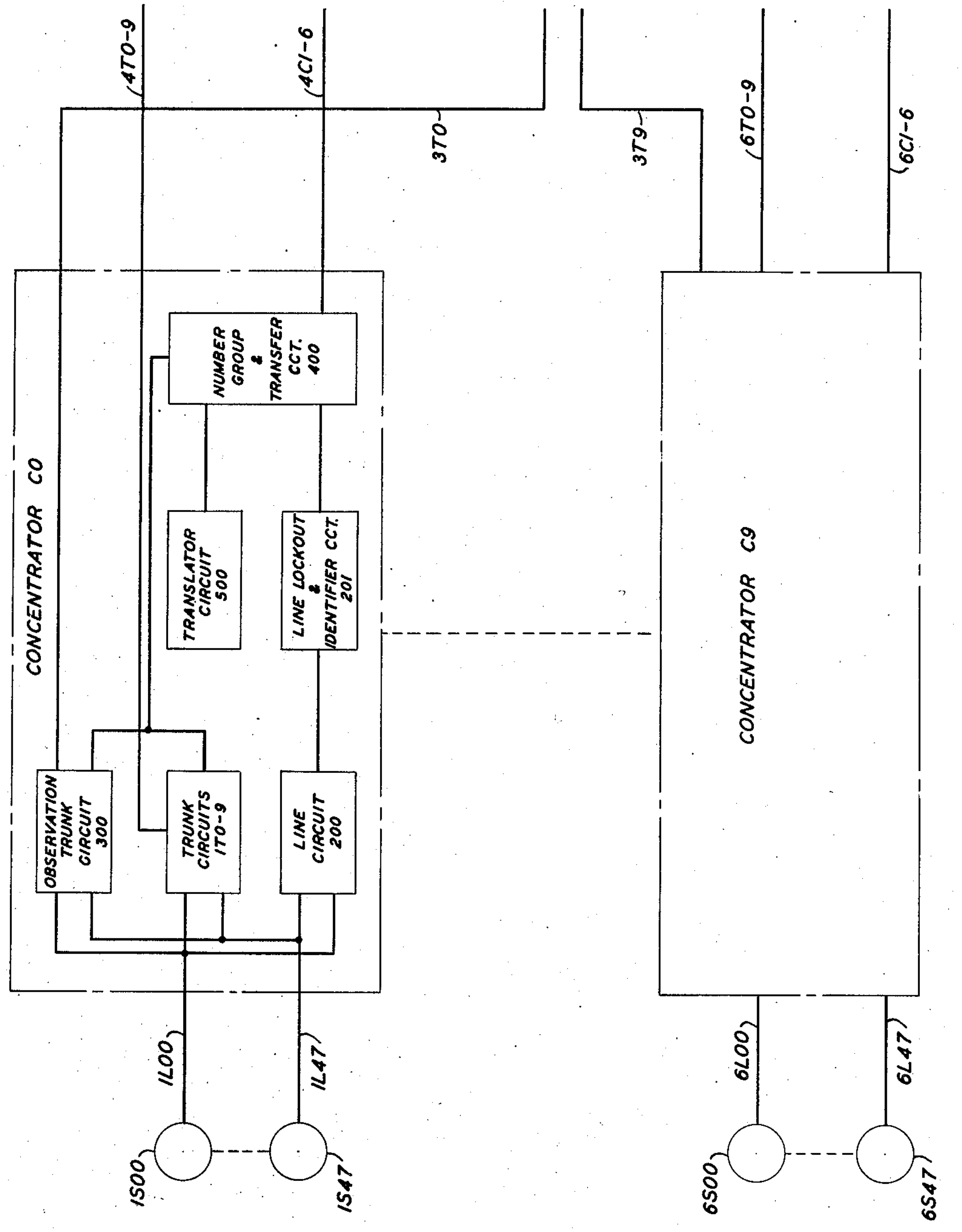
Figure 19:
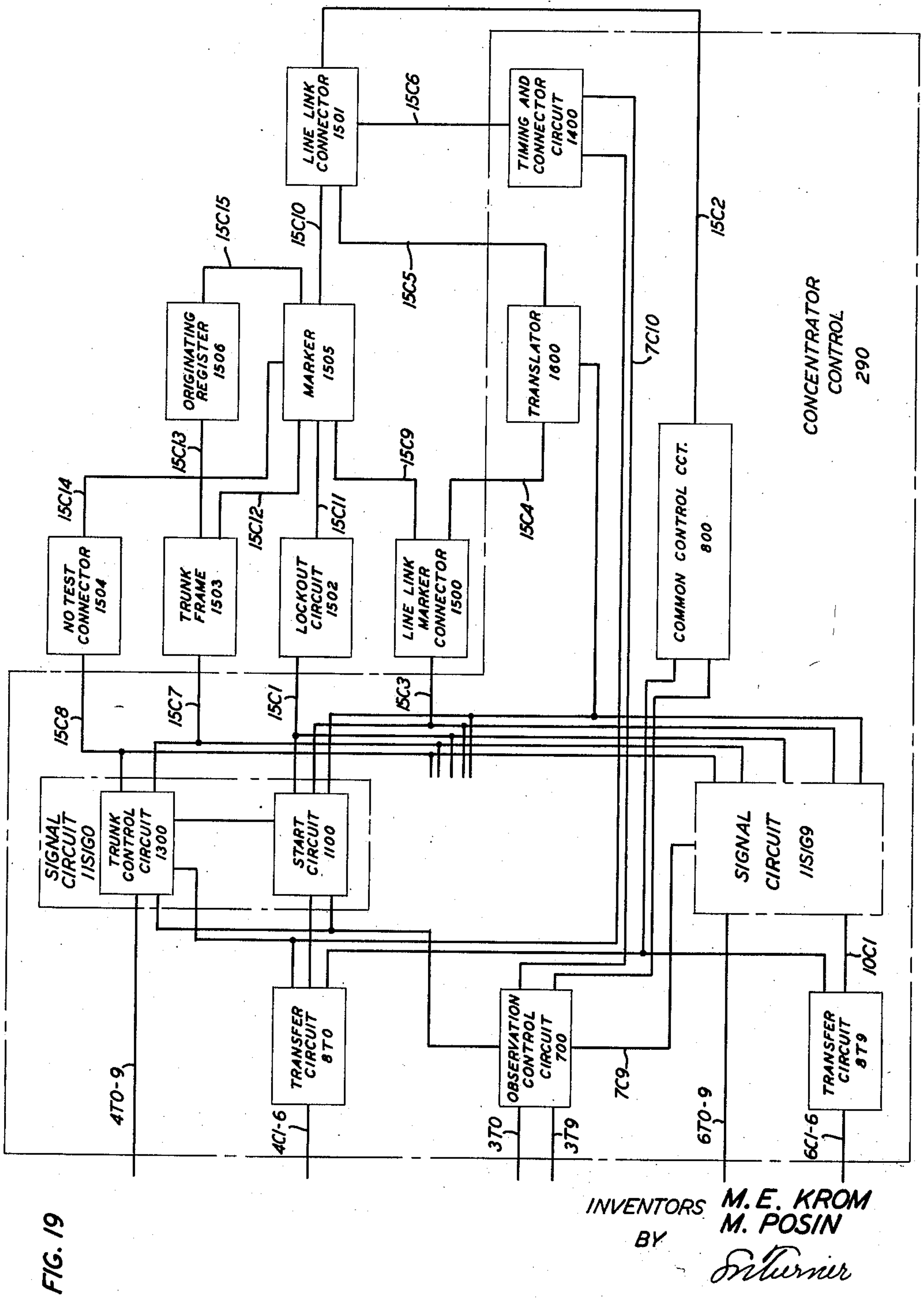

Figs. 18 and 19, when arranged with Fig. 18 to the left, are a box or functional diagram of the concentrator system of the present invention;

Fig. 20 is a table illustrating the alternating-current simplex signal from the concentrator to the central office;

Fig. 21 is a table illustrating the direct-current signals from the central office to the concentrator; and Fig. 22 is a table illustrating the concentrator-to-central office signaling during a no-test call.

Figure 1:
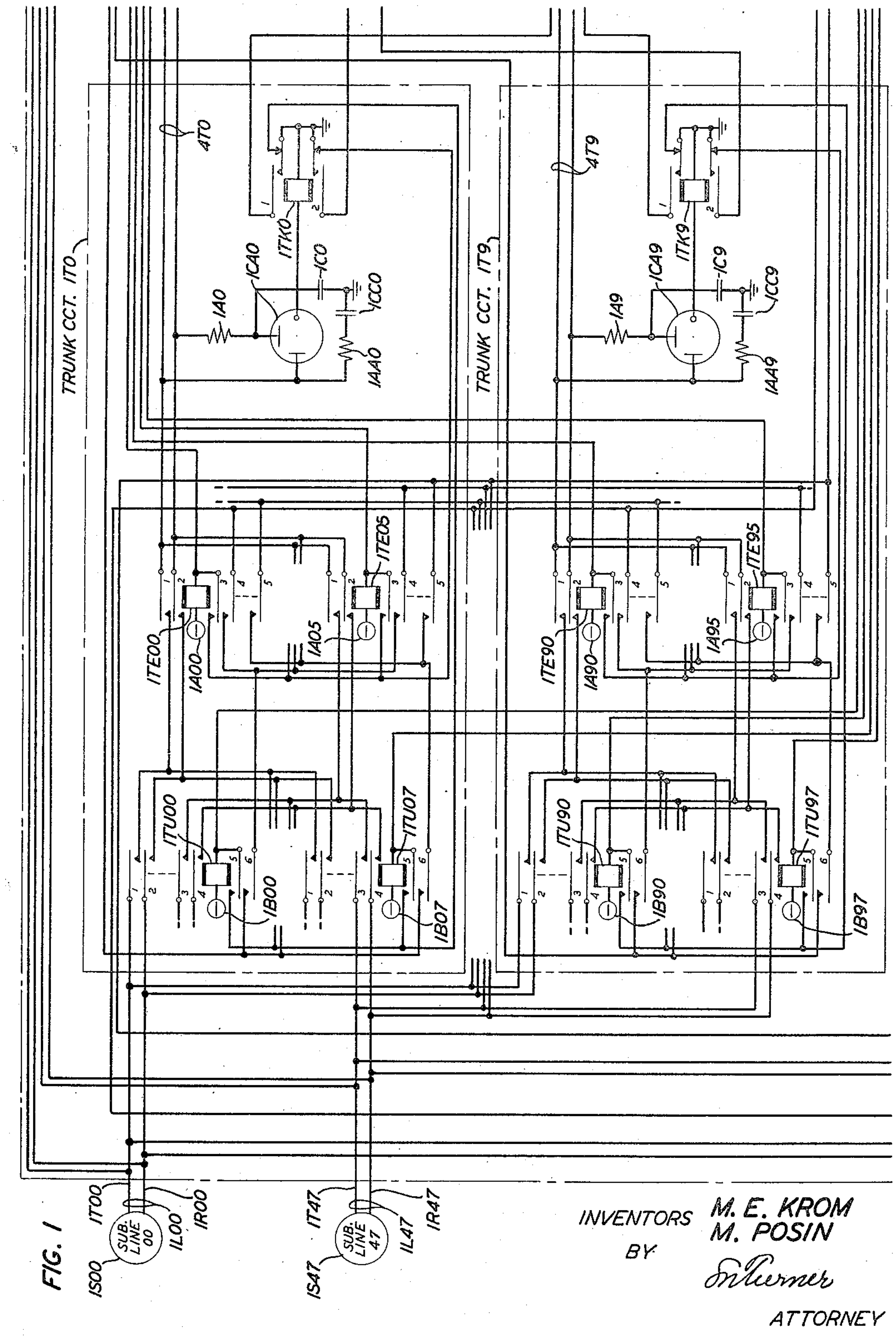
Fig. 1 illustrates the concentrator trunk circuits.
Figure 2:
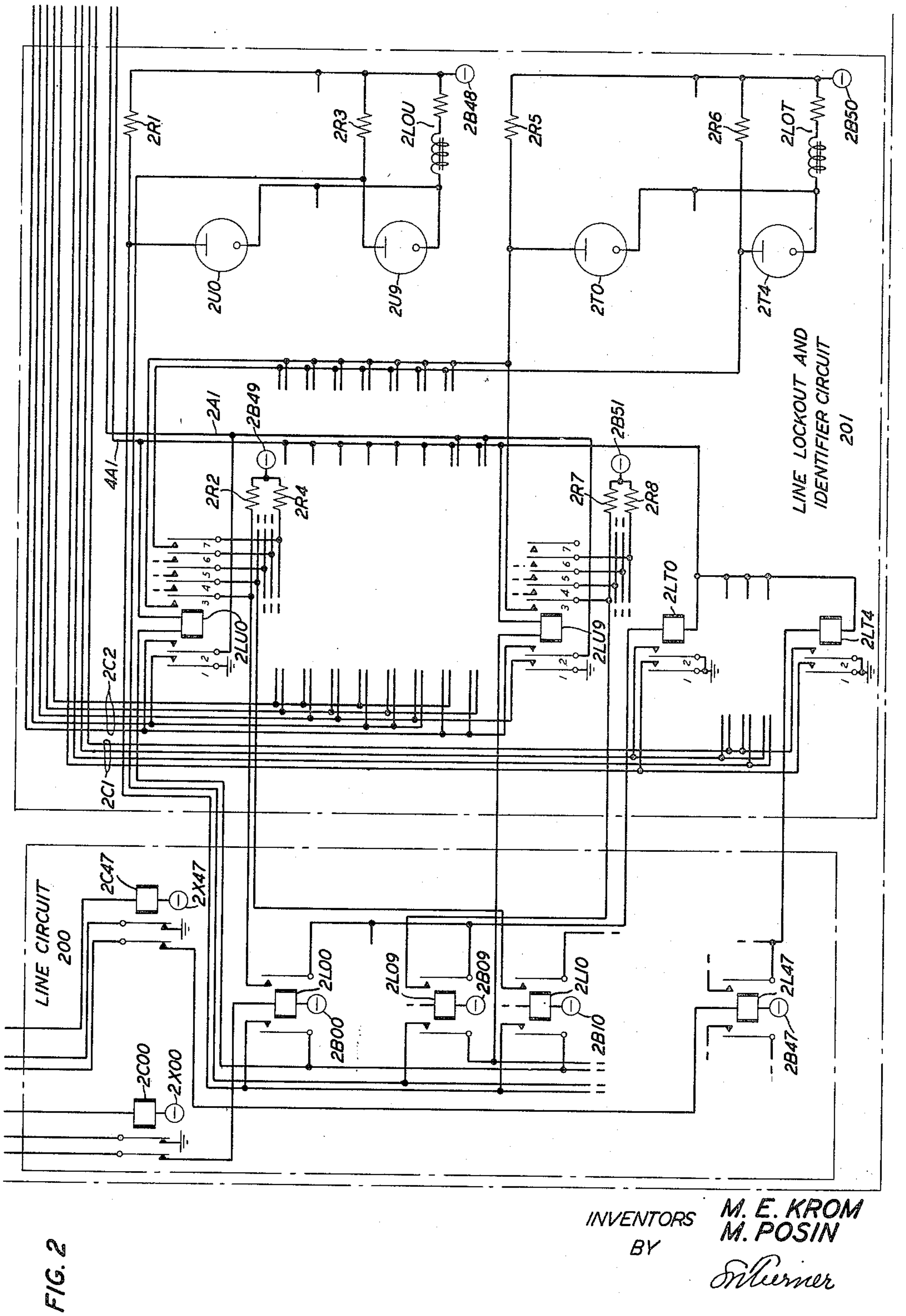
Fig. 2 illustrates the concentrator line circuit and line lockout and identifying circuit.
Figure 3:
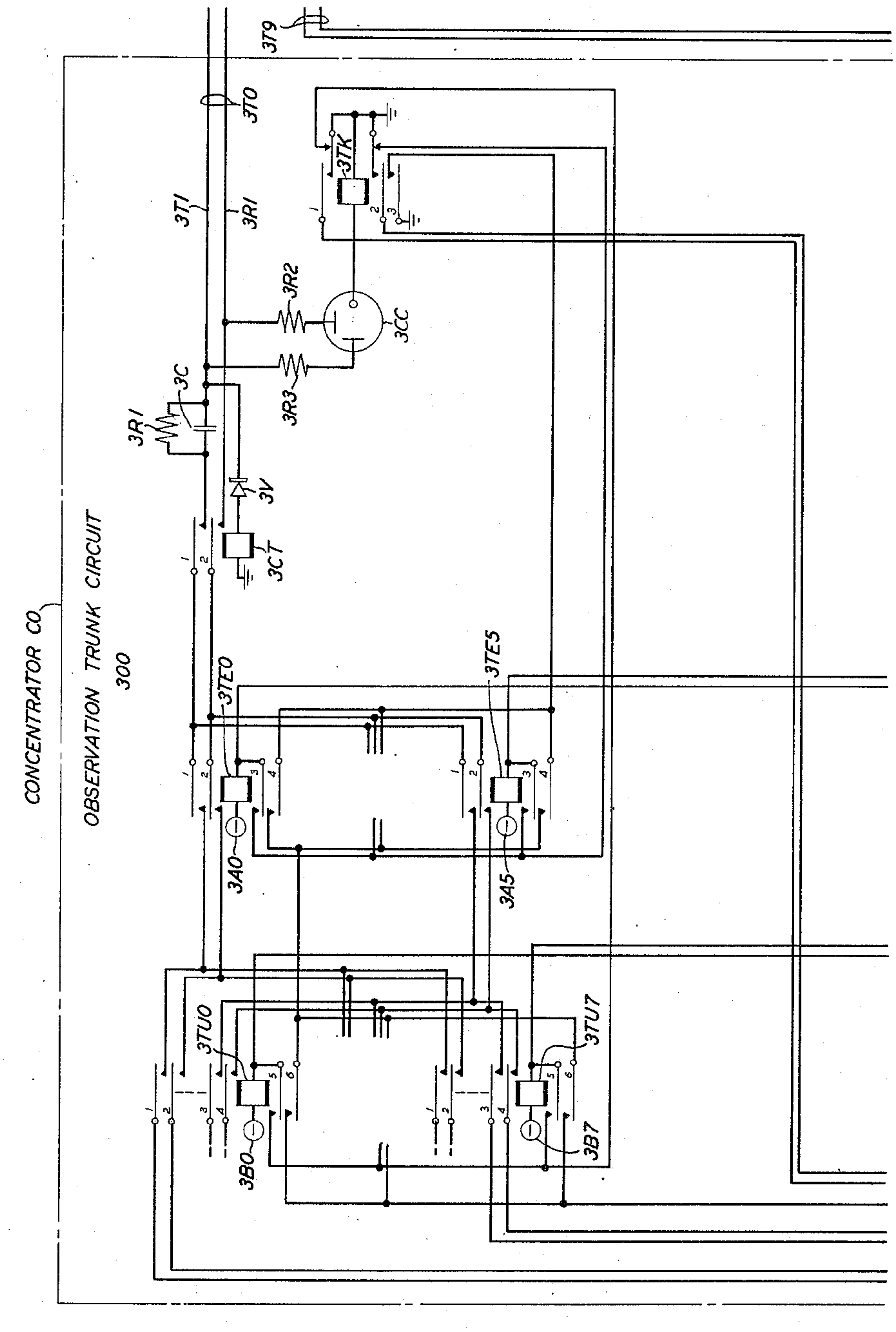
Fig. 3 illustrates the concentrator observation trunk circuit.
Figure 4:
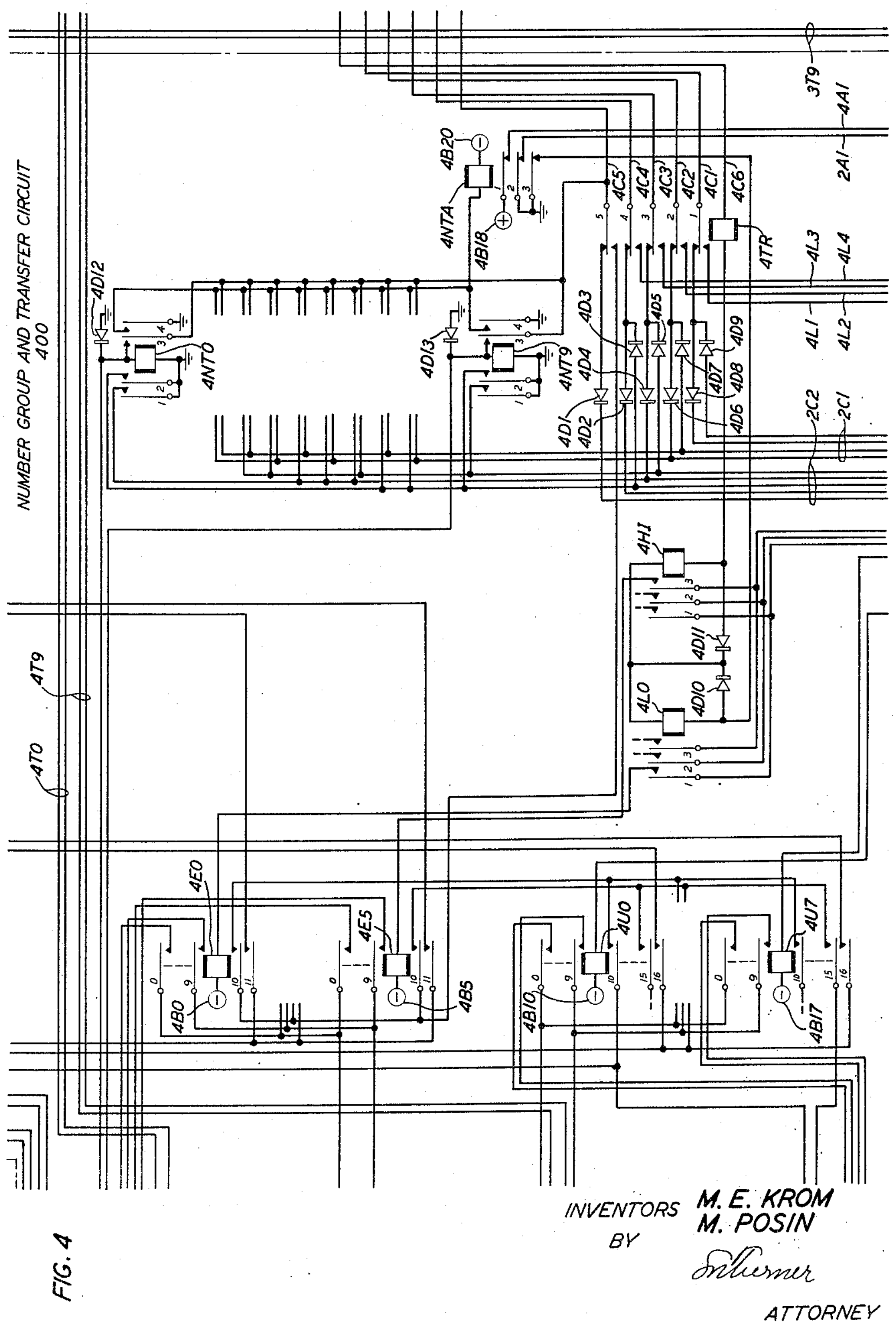
Fig. 4 illustrates the concentrator number group and transfer circuit.
Figure 5:
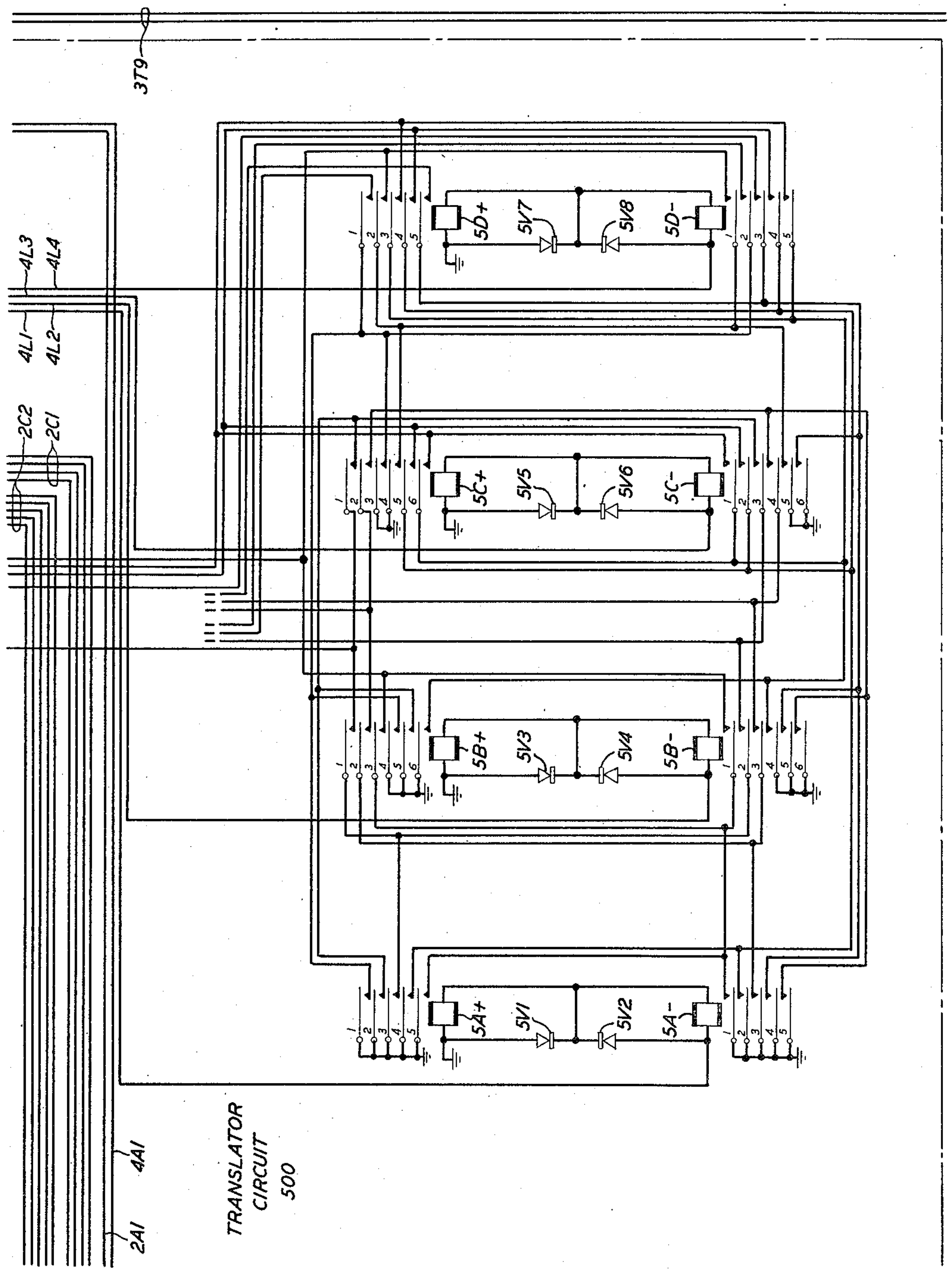
Fig. 5 illustrates the concentrator translator circuit.
Figure 6:
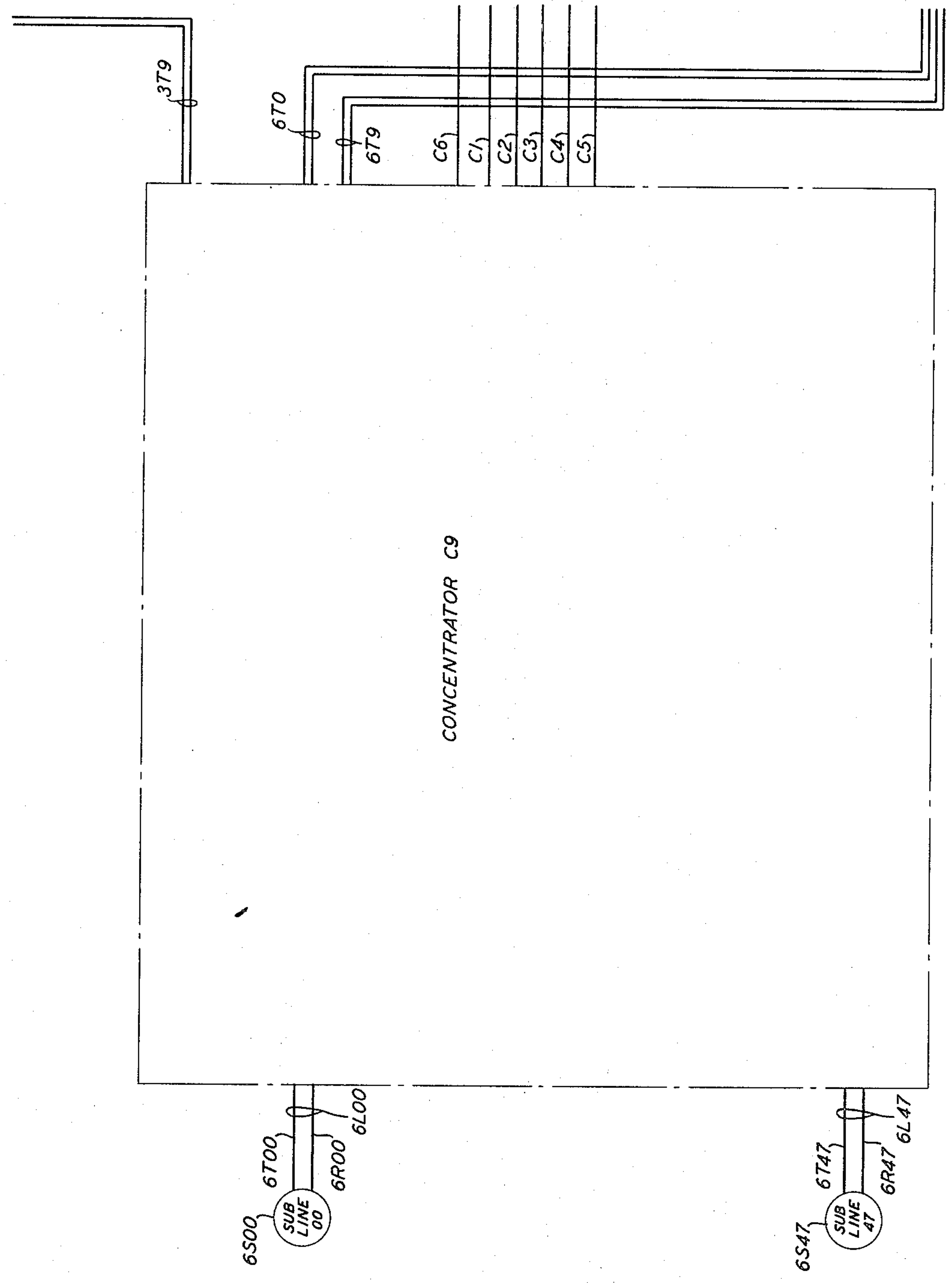
Fig. 6 illustrates diagrammatically another concentrator.
Figure 7:
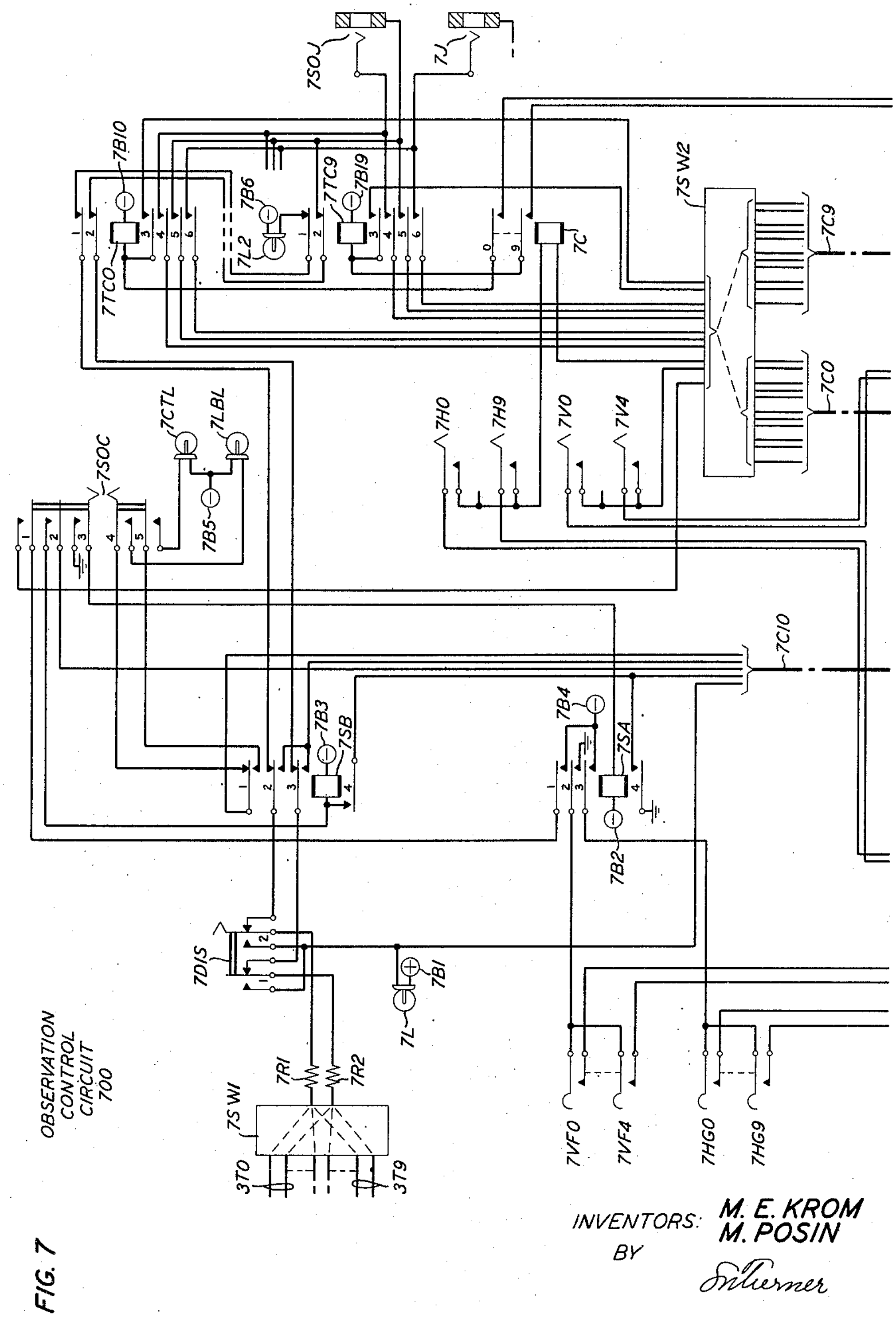
Fig. 7 illustrates the observation control circuit in the central office.
Figure 8:
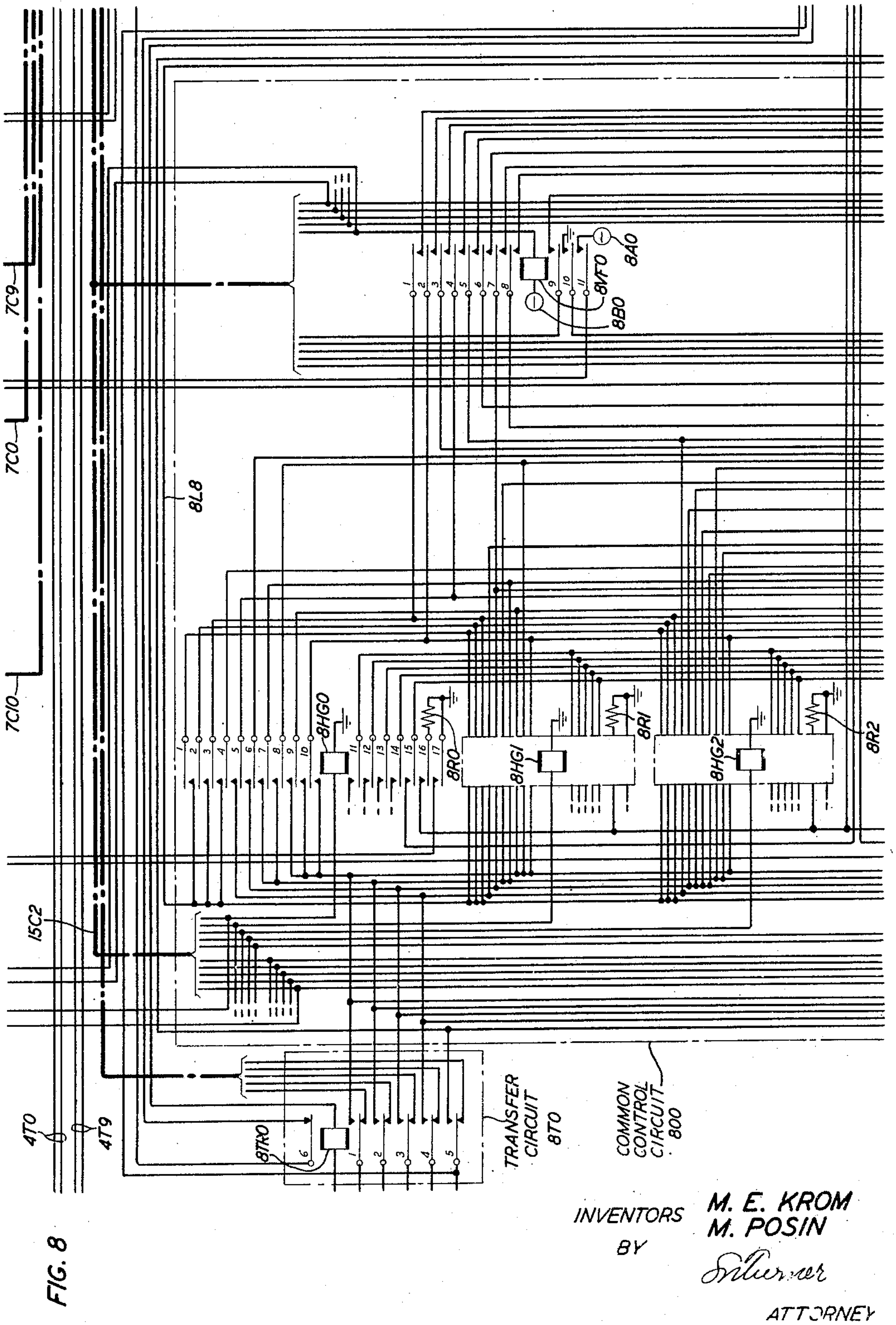
Figs. 8, 9 and 10 illustrate the transfer circuits and the common control circuit in the central office.
Figure 9:
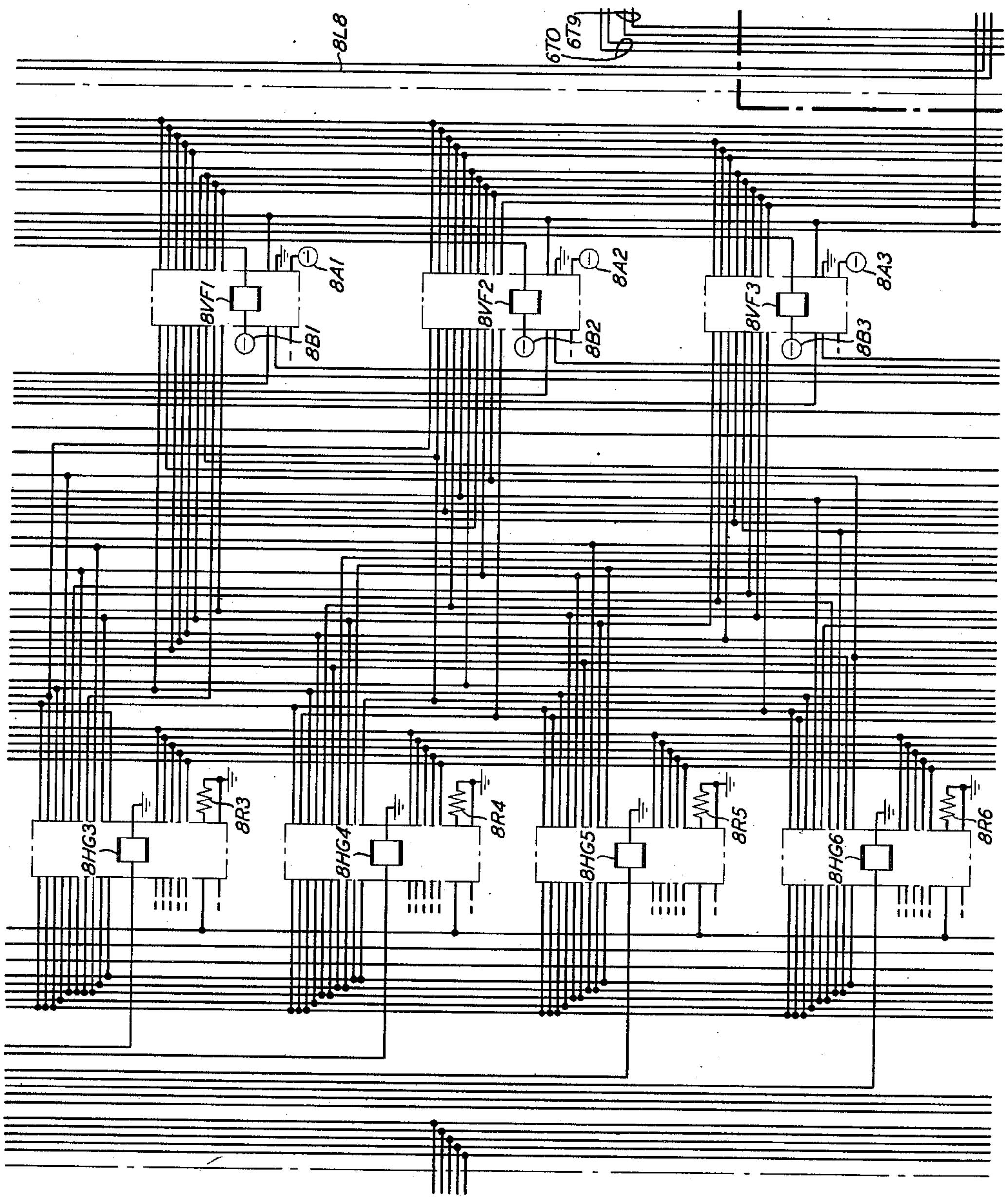
Figure 10:
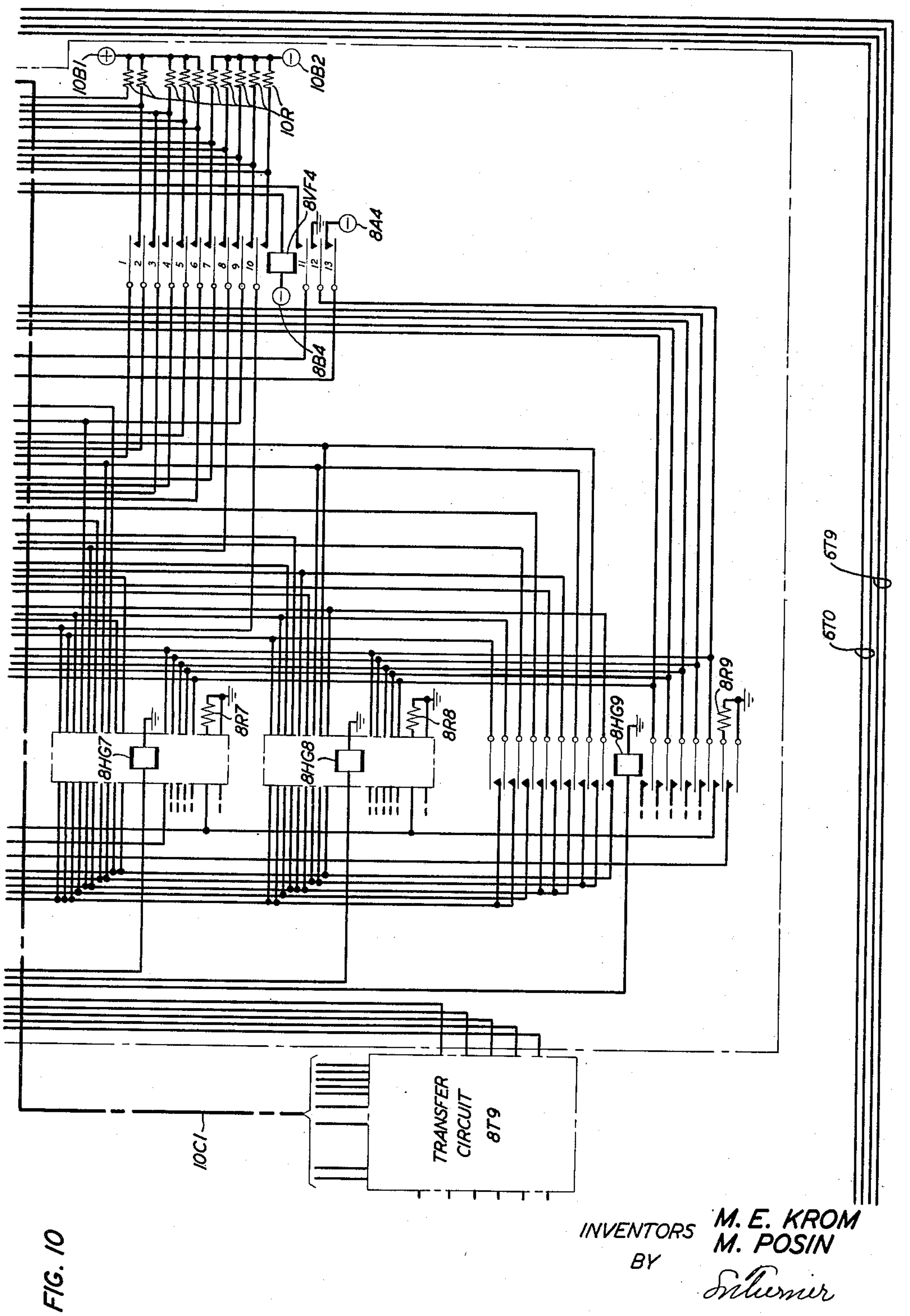
Figure 11:
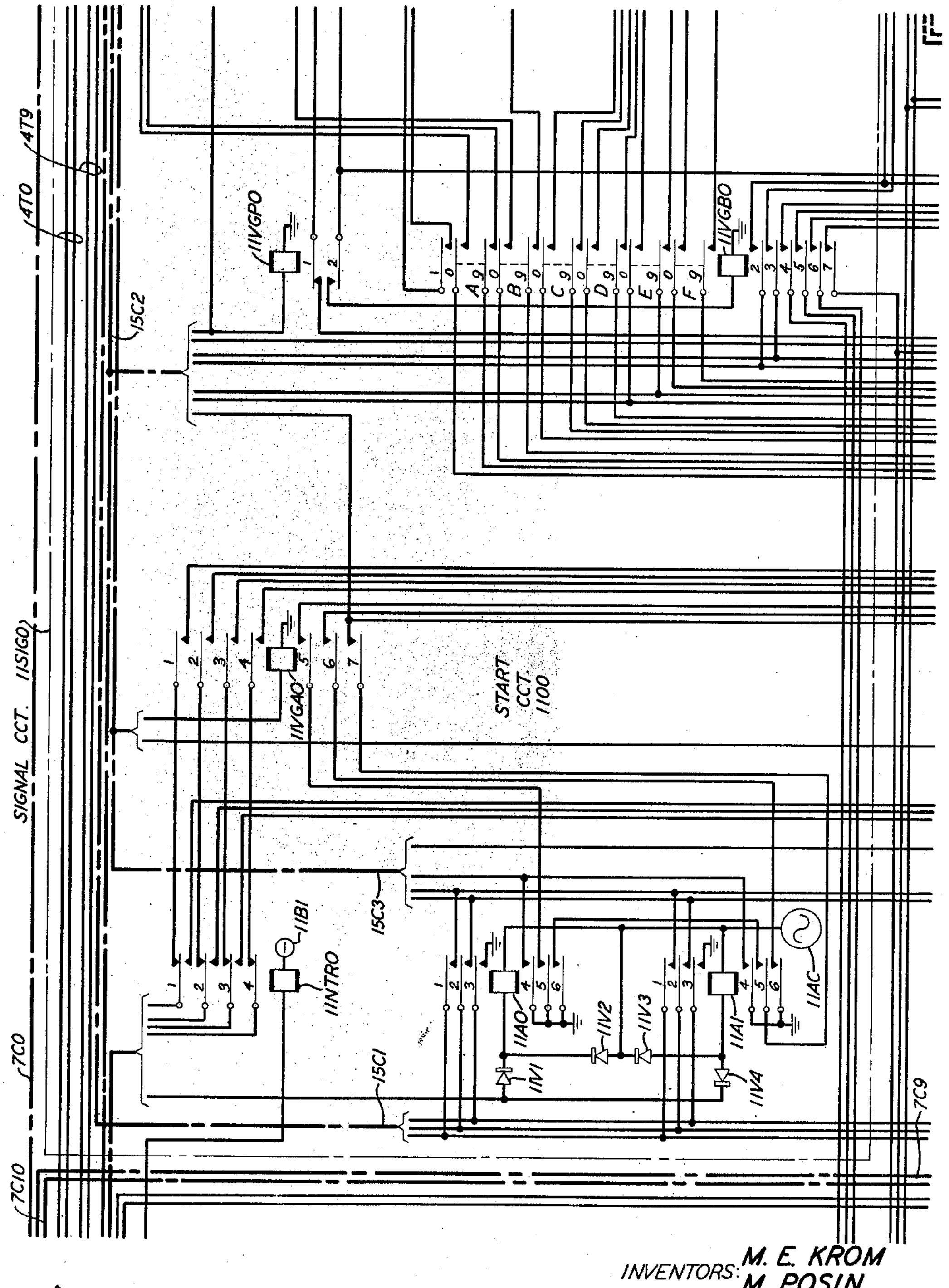
Figs. 11 and 12 illustrate a signal circuit in the central office.
Figure 12:
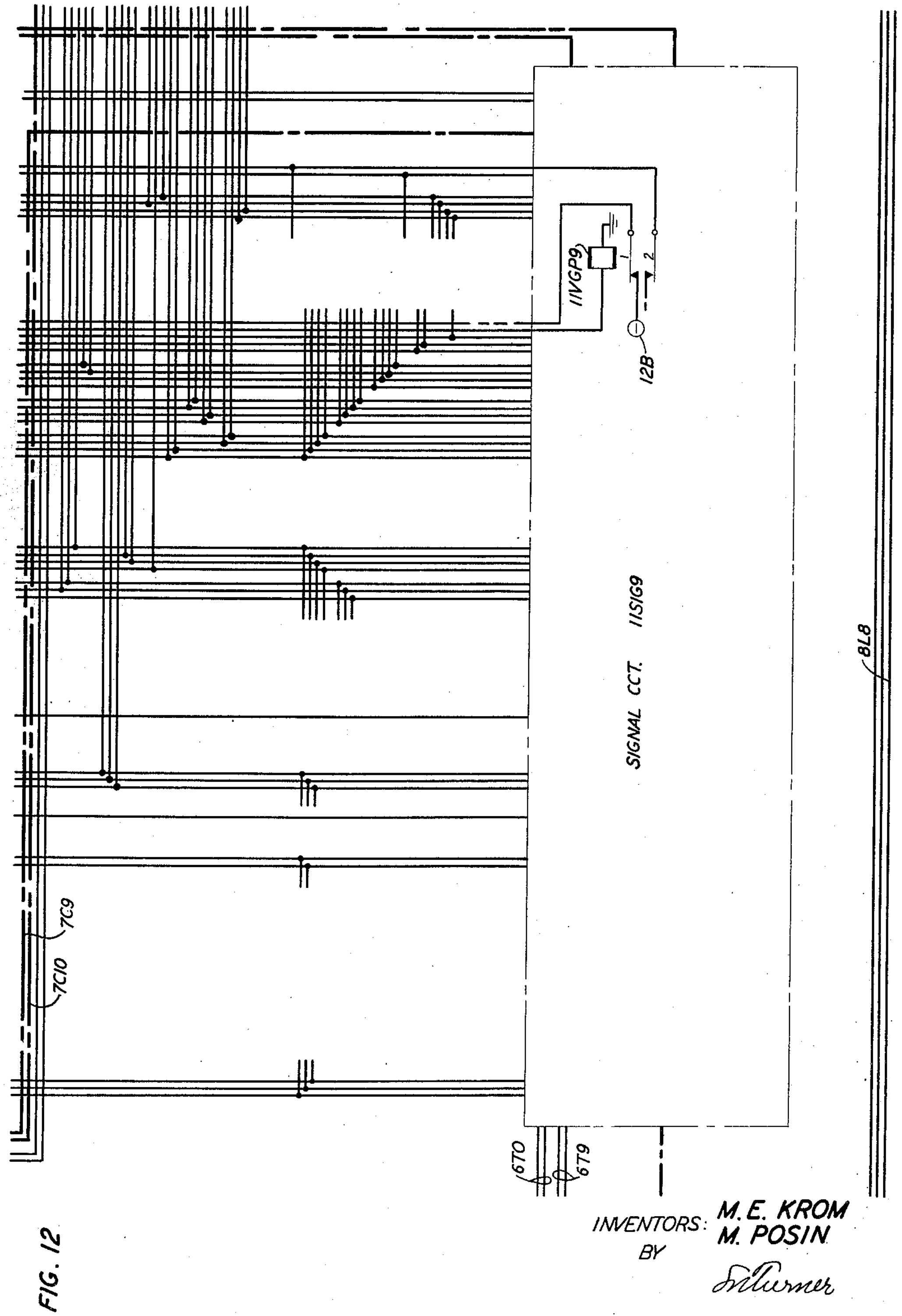
Figure 13:
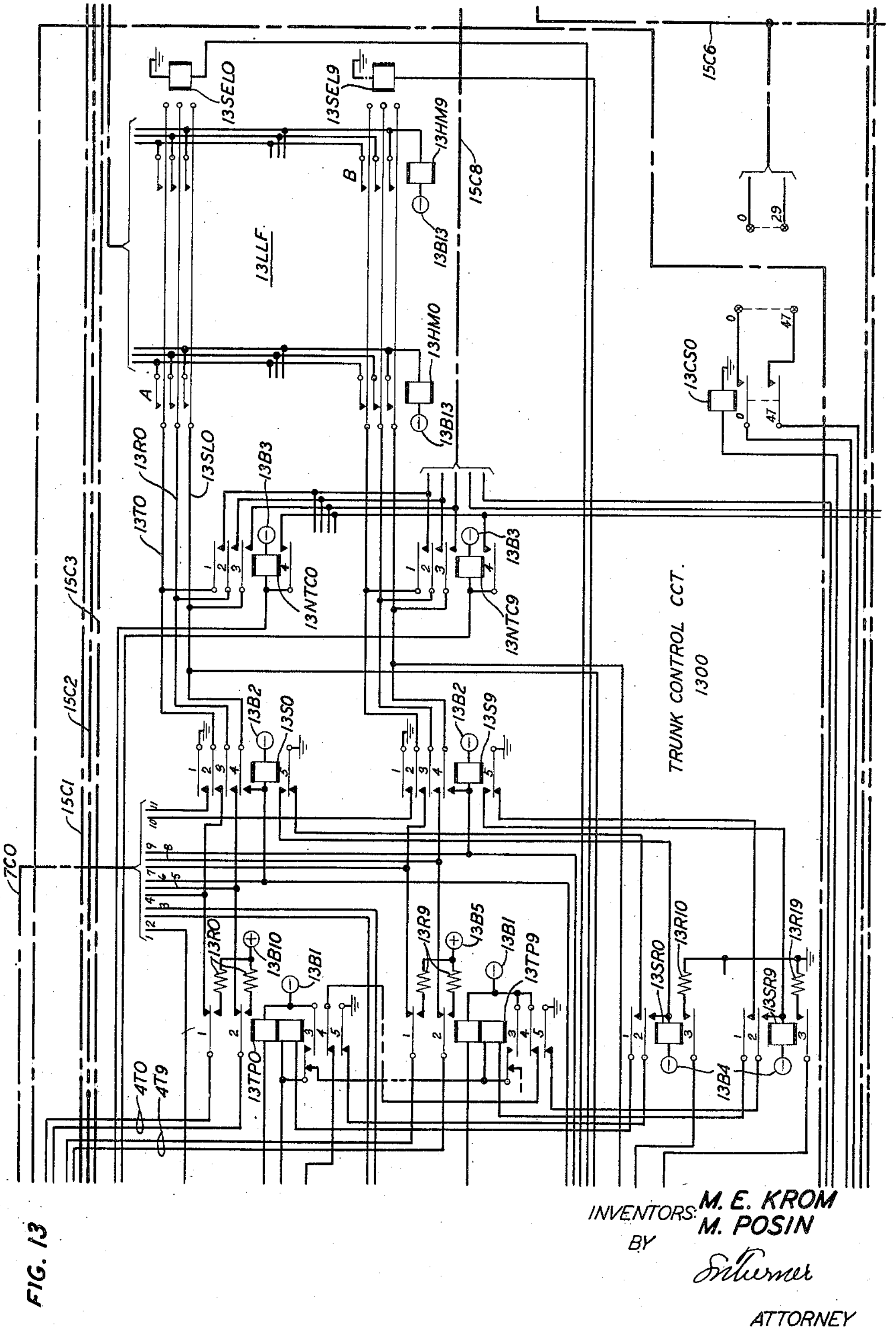
Fig. 13 illustrates diagrammatically another signal circuit in the central office.
Figure 14:
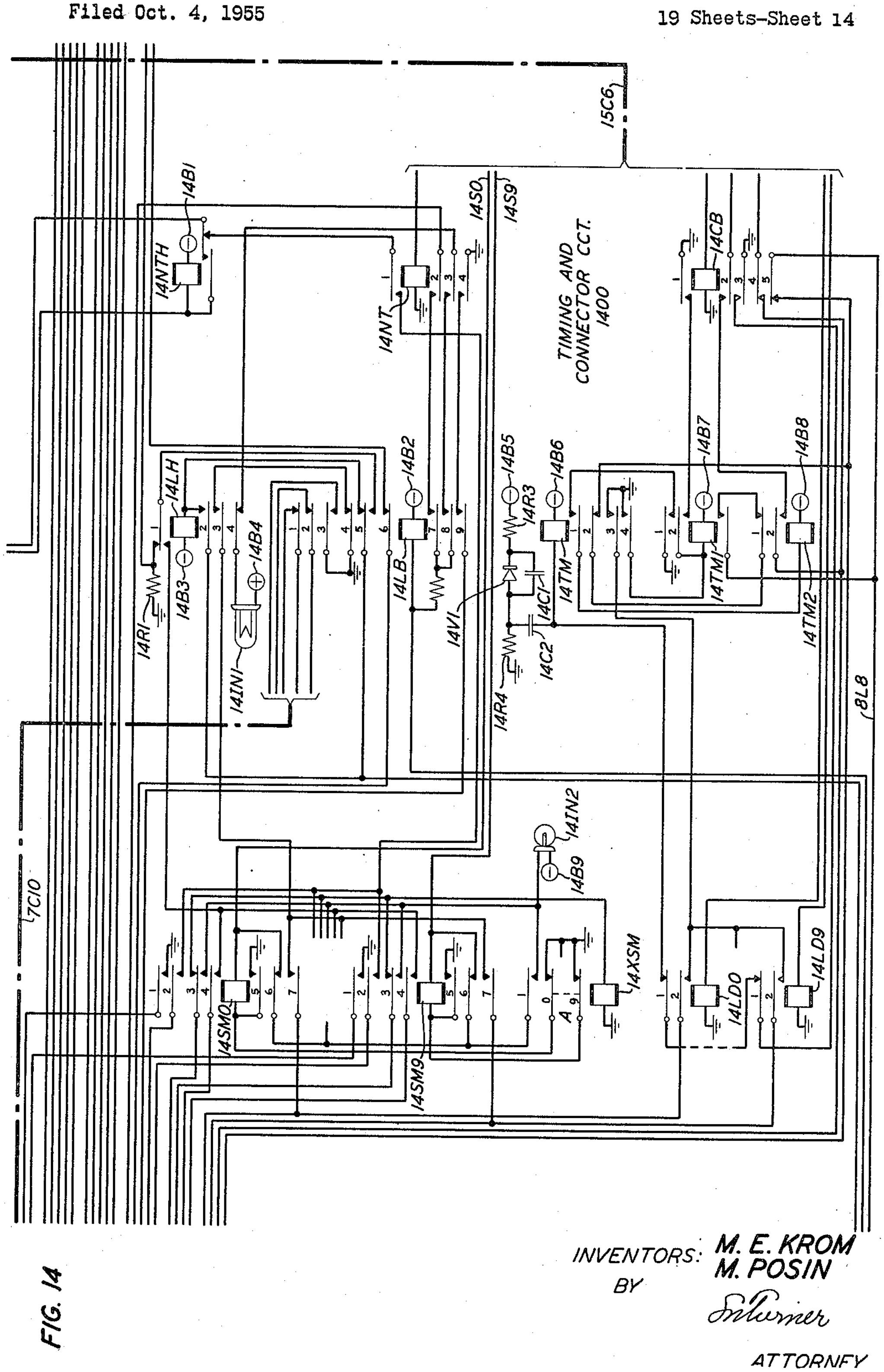
Fig. 14 illustrates a timing and connector circuit in the central office.
Figures 15, 17:
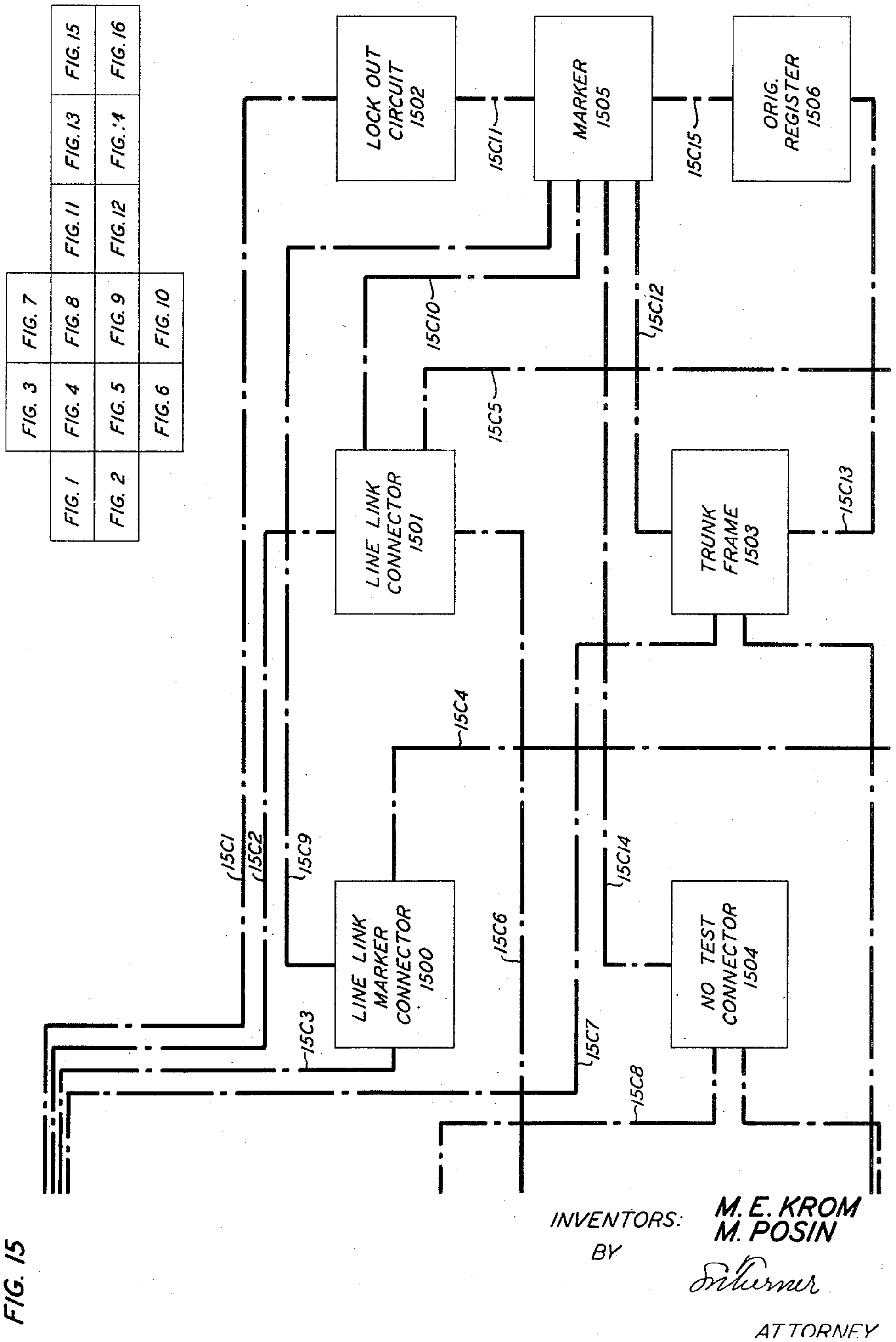
Fig. 15 illustrates diagrammatically some of the components in a No. 5 crossbar telephone system.
Fig. 17 illustrates the arrangement of Figs. 1 through 16.

In the functional circuits of Figs. 18 and 19 and in the detailed circuits of Figs. 1 through 16, when arranged in accordance with Fig. 17, the equipment has generally been given letter designations representative of functional characteristics, preceded by a number, which indicates the figure in the detailed circuits in which the equipment is located. The subscriber's station having an identifying number of 00, for example, is designated 1S00 and is shown in Fig. 1 in the detailed circuit and in Fig. 18 in the functional circuit.

GENERAL DESCRIPTION

Referring to Figs. 19 and 18, with Fig. 18 arranged to the left of Fig. 19, ten concentrators C0–9 are connected to the concentrator control 290, which is located at the central office. All the equipment and circuits shown on Fig. 19 are located at the central office, and the equipment and circuits shown on Fig. 18 are remotely located. Each one of the concentrators C0–9 provides for a connection between any one of 48 subscriber stations terminating thereat, and any one of ten talking trunks connecting the concentrator with the central office. The concentrator C0, for example, provides for connections between the substations 1S00–47, which are connected thereto, respectively, by the lines 1L00–47, and the ten trunks 4T0–9. Each of the ten concentrators C0–9 is also connected to the central office concentrator control 290 by six control leads and one observation trunk; the concentrator C0, for example, by the leads 4C1–6 and trunk 3T0, and the concentrator C9 by the leads 6C1–6 and the trunk 3T9. The illustrative embodiment of the observation system of the present invention includes, therefore, ten sets of talking trunks and control leads and ten observation trunks 3T0–9.

The concentrators C0–9 and the control 290 are connected into a crossbar telephone system of the type described in the Patent 2,585,904 which was granted to A. J. Busch on February 19, 1952. The connectors 1504, 1500, 1501, the register 1506, the lockout circuit 1502, the marker 1505 and the trunk frame 1503 are standard components in such crossbar systems.

In such crossbar telephone systems, two basic types of switching frames are utilized; trunk frames such as trunk frame 1503, and line link frames, not shown in the functional circuits of Figs. 19 and 18. The frame 13LLF, which is part of the trunk control circuits 1300 in the signal circuits 11SIG0–9, is equivalent to the secondary of the crossbar line link frame disclosed in the above-identified Busch patent. Ordinarily, subscriber lines are associated with the line link frames, and all types of outgoing and incoming trunks and originating registers are associated with the trunk frames. The general effect of the concentrators C0–9 and the control 290 is to remove the function of the primary line link frame to a remote point, so as to reduce the conductor mileage connecting the subscribers to the central office. The concentrators C0–9 are, in this manner, inserted between the frames 13LLF in the circuits 1300, and the subscriber stations 1S00–47, 6S00–47, etc. Each vertical group of the ordinary primary line link switch, or frame, becomes one of the concentrators C0–9 in the concentrating system.

When the observation operator desires to observe on one of the concentrator subscriber lines, switches are operated in an observation control circuit 700 to indicate which one of the concentrators C0–9 has the line to be observed terminating thereat. Thereafter, the operator operates keys in the observation control circuit 700, in accordance with the identity of the subscriber line to be observed, and to provide an observation connect potential. The observation control circuit 700 also operates a start circuit 1100 in one of the ten signal circuits 11SIG0–9, and supplies the identity of the line to a common control circuit 800. If the line which is to be observed is line 1L00 terminating at concentrator C0, the start circuit 1100 in signal circuit 11SIG0 is operated, and the identity of the line 1L00 in the form of a vertical file and horizontal group indication is registered in the control circuit 800. The start circuit 1100 and the common control circuit 800 provide a positive potential for line numbers between 0 and 23 and a negative potential for line numbers between 24 and 47 through the central office transfer circuit 8T0 and control lead 4C6 to the number group and transfer circuit 400 in concentrator C0. The transfer circuit 8T0, which is individual to concentrator C0, operates together with circuit 400 to transfer the control leads 4C1–5 for a terminating signaling operation. A terminating signaling operation is effectively central office-to-concentrator signaling. The control circuit 800 also translates the vertical file and horizontal group indication to a two-out-of-eight positive and negative direct-current pulse code. The code has a maximum of 24 possible combinations as shown in Figure 21. The two-out-of-eight coded signals are sent through the transfer circuit 8T0 and the four control leads 4C1–4 to the circuit 400. The polarity of the signal through the sixth control lead 4C6, as described above, indicates whether the 24 combinations are from 0 to 23 or from 24 to 47.

The circuit 400, in the concentrator C0, supplies the transmitted coded signals to a number group translator 500 which translates the two-out-of-eight code direct-current signals to a six and an eight-unit code indication for the tens and units digit, respectively. The six and eight-unit code indication is supplied, by the circuit 500, back to the number group and transfer circuit 400. The circuit 400 now supplies the information to each of ten trunk circuits 1T0–9, and to an observation trunk circuit 300. The trunk circuits 1T0–9, as hereinafter described, together provide a connection between any one of the talking trunks 4T0–9 and any one of the subscriber lines 1L00–47. The observation trunk circuit 300 functions to connect the observation trunk 3T0 to any one of the lines 1L00–47.

In the illustrative example described herein, the six and the eight-unit code, supplied by circuit 400, is utilized, as is hereinafter described, in operating the observation trunk circuit 300 to provide for a connection between the line 1L00 and the observation trunk 3T0. When the coded information is supplied to the circuits 1T0–9, a line busy test is made of the line 1L00. If one of the trunk circuits 1T0–9 is being utilized to establish a connection to line 1L00, it supplies a busy potential through the number group and transfer circuit 400, the control lead 4C5 and transfer circuit 8T0 to the timing and connector circuit 1400. The circuit 1400 provides the busy indication through cable 7C10 to the observation control circuit 700. The circuit 700 provides a visual indication, thereof, to the observation operator, and also prevents the transmission of a connect potential over the tip and ring leads of trunk 3T0 to the observation trunk circuit 300. Responsive to the visual indication, the operator releases the horizontal and vertical file keys in the observation control circuit to release the start circuit 1100 and the control circuit 800. When control circuit 800 releases, it releases transfer circuit 8T0, the circuit 1400 and circuit 400, in concentrator C0. Circuit 400, in turn, releases the translator circuit 500.

If line 1L00 is idle, the timing and connector circuit 1400 in the central office is not operated, and circuit 700 is not prevented from sending the connect potential. After a predetermined interval the observation control circuit 700 supplies a plus 200-volt readying potential over the tip and ring of trunk 3T0. The readying potential, together with the coded signal from circuit 400, control the observation trunk circuit 300 to ready a connection between line 1L00 and trunk 3T0. When trunk circuit 300 operates, it provides a line busy crosspoint closure indication through circuit 400, lead 3C5 and transfer circuit 8T0 to the circuit 1400. Circuit 1400 provides an indication of the crosspoint closure through cable 7C10 to the observation control circuit 700. Circuit 700 removes the connect potential, and provides a visual indication of the crosspoint closure to the operator.

When the operator releases the vertical file and horizontal group keys in circuit 700, the circuits 1100 and 800 are released and in turn release circuits 8T0, 400 and 500. When the keys are released, a negative connect potential is provided, by the observation control circuit 700, over the tip lead of trunk 3T0 to the trunk circuit 300 which completes the connection between line 1L00 and trunk 3T0. The connection from the line 1L00 to the observation control circuit is utilized to provide a signal to the observation operator as soon as the subscriber at station 1S00 lifts the receiver to originate a call.

When a call is originated on line 1L00 a sequence of operations is initiated for establishing a connection from line 1L00 through concentrator C0 and one of the talking trunks 4T0–9 to an originating register 1506 in the central office. At the same time a signal is provided to the observation operator, which also establishes a connection at the central office from the observation control circuit 700 to one of trunks 4T0–9 which is used for the call. Before the connection is established from circuit 700 to the selected one of trunk 4T0–9 the bridging connection through trunk 3T0 is removed at the observation trunk circuit 300.

The signal provided from line 1L00 is through the observation trunk circuit 300, the ring lead of trunk 3T0, to the observation control circuit 700. The attention of the operator is in this manner attracted before the operation of the concentrator control 290 and the concentrator C0.

More specifically, when a call is originated on the subscriber line 1L00, the line circuit 200 is operated to indicate the demand for service, or request for dial tone. The operation of the line circuit 200 initiates the operation of a line lockout and identifier circuit 201, which locks out the other 47 lines 1L01–47 connected to concentrator C0, and which identifies the calling line 1L00.

The line lockout and identifier circuit 201 identifies the units and tens digits of the calling line 1L00, and supplies the information, in decimal code, to a number group and transfer circuit 400. The circuit 400 translates the decimal indication to a two-out-of-four code for the tens digit, and to a two-out-of-five code for the units digit and also readies a path for transmitting the coded identification of the calling line over the six control leads 4C1–6 to the central office control 290. Five leads 4C1–5 are utilized to signal the units and the tens digits of the calling line to the central office control 290. Each of the leads 4C1–5, as is hereinafter described, carries either the positive half cycles, or the negative half cycles, or both, of an alternating-current potential, in accordance with a code shown in Fig. 20. The sixth signal lead 4C6 is a transfer signal lead, which is energized at the central office after a marker 1505 has been seized. The lead 4C6 is energized to transfer the other five signaling leads 4C1–5 for a terminating operation resulting in the connection of the calling line 1L00 to a selected one of ten talking trunks 4T0–9.

The readied code signal paths, from the circuit 400 in the line concentrator C0, pass through the transfer circuit 8T0 in the central office concentrator control 290, to a start circuit 1100 which is part of the signal circuit 11SIG0, mentioned above. The path through control lead 4C1 is completed in the start circuit 1100, but the paths readied by the circuit 400 in the concentrator C0 through the control leads 4C2–5 and the transfer circuit 8T0, are not completed at this time in the start circuit 1100. As is hereinafter described, when the marker 1505 is seized, the start circuit 1100 is operated to complete the four paths from the concentrator C0 to the translator 1600 in the central office concentrator control 290.

When the path from circuit 400 through lead 4C1 is completed, the start circuit 1100 operates the lockout circuit 1502. Lockout circuit 1502 prevents a false service request, or start, when the line-to-register connection, hereinafter described, is released during the callback sequence of operations. If another call is waiting to be served, the lockout circuit 1502 does not operate. The start circuit 1100 also provides a start signal, which is also a line link frame identification through cable 15C3 to the line link marker connector 1500. The start signal functions through cable 15C9 to call in a marker 1505 and to supply the frame identification thereto. The start circuit 1100 also functions to provide an indication of the vertical group number of the concentrator C0 through cable 15C3, the line link marker connector 1500, and cable 15C9 to the marker 1505.

When the line link marker connector 1500 seizes the marker 1505 and passes thereto the signal from circuit 1100 indicating the frame and concentrator identity or location, it also provides an operating potential back to the start circuit 1100. The start circuit 1100 thereupon completes the signal paths through leads 4C2–5 from circuit 400, through transfer circuit 8T0, and start circuit 1100 to the translator 1600.

A portion of start circuit 1100 which is connected through the transfer circuit 8T0 to lead 4C6 functions, together with the translator 1600, to register the alternating-current simplex signals transmitted through the leads 4C1–5. The two-out-of-four coded signals for the tens digit and the two-out-of-five coded signals for the units digit are registered, and translated into decimal code. The units digit is supplied from translator 1600 through cable 15C4 to the line link marker connector 1500 which, in turn, supplies it through cable 15C9 to the marker 1505. The tens digit is supplied to the marker 1505 partially from translator 1600 through cable 15C5, the line link connector 1501 and the cable 15C10 and partially from circuit 1100 through cable 15C3, the line link connector 1500 and cable 15C9.

When marker 1505 was seized by the connector 1500, it, in turn, seized the line link connector 1501 through cable 15C10. The units and tens digits of the calling line are, in this manner, supplied by the concentrator control 290 through the connectors 1500 and 1501, respectively, to the marker 1505, as horizontal group and vertical file indications. The marker 1505, having this information, seizes the concentrator control 290 through a line link connector 1501 and supplies thereto the concentrator or vertical group identity together with the vertical file and horizontal group information. The concentrator identity determines the selection of the circuits 11SIG0, and 8T0, as is hereinafter described, and the horizontal group and vertical file information is supplied through cable 15C2 to the common control circuit 800 in the control 290 where it is recorded. Thereafter, the circuit 800 operates the transfer circuit 8T0 and the circuit 400 in the concentrator C0 to transfer the five signaling leads 4C1–5 for signaling from the central office to the concentrator C0. The circuit 800 also supplies positive potential over the sixth lead 4C6 for line numbers between 0 and 23 and a negative potential for line numbers between 24 and 47. The control circuit 800 also translates the registered identity of the tens and units digits, or the horizontal group and vertical file indication, to a two-out-of-eight positive and negative direct-current pulse code which has a maximum of 24 possible combinations. The two-out-of-eight coded signals are sent through the transfer circuit 8T0, at the central office, and the four control leads 4C1–4 to the number group and transfer circuit 400, at the concentrator C0. As described above, the polarity of the signal through the sixth control lead 4C6 determines whether the 24 combinations are from 0 to 23 or from 24 to 47.

At the same time that the control circuit 800 provides the direct-current coded signals to the concentrator C0, it provides a ready potential to the observation control circuit 700 for establishing a connection therefrom to a selected one of trunks 4T0–9.

The circuit 400 in the concentrator C0 supplies the coded signals to a number group translator 500, which converts the two-out-of-eight coded direct-current signals to a six and an eight-unit code indication. The six and eight-unit code indication is supplied by the circuit 500 back to the number group and transfer circuit 400. The six and eight-unit code indication is supplied by the circuit 400 to each of the ten trunk circuits 1T0–9 to control the establishment of a connection between a selected one of the trunks 4T0–9 and the calling line 1L00.

When the marker 1505 is connected to the concentrator control 290 through the connector 1501, it also obtains access thereto for selecting an idle one of the trunks or links 4T0–9 in setting up the call. The marker 1505 operates the connector circuit 1400 through the cable 15C10, the line link connector 1501, and cable 15C6. The connector circuit 1400 supplies the identity of the selected trunk, 4T0 for example, to the trunk control circuit 1300, which connects a high positive voltage over both sides of the selected trunk 4T0 toward the concentrator C0 as a seizure potential, and the circuit to the observation control circuit 700. The trunk control circuit 1300 in circuit 11SIG0 also readies a path from the trunk frame 1503 through cable 15C7 to the selected trunk 4T0. When the observation control circuit 700 receives an indication of the identity of the selected link or trunk 4T0, it completes a path from an observation jack 7SOJ, not shown in Figs. 18 and 19 to the trunk control circuit 1300 in signal circuit 11SIG0. When it is determined, as is hereinafter described, that the trunk circuit 1T0 operated to connect the calling line 1L00 to the selected trunk 4T0, the trunk control circuit 1300 operates to connect the observation jack 7SOJ to the trunk 4T0. The observation control circuit 700, upon receiving an indication of the selected trunk 4T0, also removes the negative tip potential from trunk 3T0 to cause the observation trunk circuit 300 to open the connection from line 1L00 to trunk 3T0 in order to eliminate transmission losses due to the bridging trunk 3T0.

The seizure potential, which is provided by circuit 1300, is supplied through the trunk 4T0 to the trunk circuit 1T0. Each trunk 4T0–9 may be connected to any one of the 48 calling lines 1L00–47 associated with the concentrator C0 by means of the associated one of the trunk circuits 1T0–9. The operation of the trunk circuit 1T0, which is associated with the selected trunk 4T0, is controlled by the number group and transfer circuit 400 when the seizure potential is received. The potential provided through the trunk 4T0 to the trunk circuit 1T0, in this manner, effectively closes a crosspoint to, or provides a connection between, the calling line 1L00 and the trunk 4T0. When the trunk circuit 1T0 is operated, it also operates the line circuit 200 to provide a line busy indication through the number group and transfer circuit 400, lead 4C5 and the transfer circuit 8T0, to the timing and connector circuit 1400 as an indication that the line crosspoints are closed. The circuit 1400 operates the trunk control circuit 1300 which removes the high voltage potential through the trunk 4T0, and completes the path from trunk 4T0 to the trunk frame 1503 and also to the observation jack 7SOJ in circuit 700. The trunk frame 1503, responsive to the connection of trunk 4T0 thereto, provides an indication through cable 15C12 to the marker 1505 that the line crosspoints are closed. When the marker 1505 receives this indication, it connects the originating register 1506 through cable 15C13, trunk frame 1503 and cable 15C7 to the trunk control circuit 1300 in circuit 11SIG0 to supply dial tone over trunk 4T0 through concentrator C0 to the calling line 1L00. When the register 1506 is connected to the calling line 1L00, the marker 1505 disconnects.

The marker holding time for serving the call to provide dial tone was approximately 300 milliseconds. Due to the utilization of relatively rapid direct-current coded signals from the central office to the concentrator C0, only approximately 10 milliseconds are added ot the marker holding time. If alternating-current simplex signals were utilized during the marker holding time that are similar to the signals utilized for transmitting the identity of the calling line 1L00 from the concentrator to the central office before the marker 1505 was seized, the marker holding time would be increased approximately 40 milliseconds. The utilization of alternating-current simplex signaling from the concentrator C0 to the central office is to avoid a multiplicity of potential sources at the concentrator C0, or to avoid power dissipation in supplying the voltage to the concentrator C0, whereas the utilization of direct-current signaling from the central office to the concentrator C0 is to maintain the marker holding time as low as possible.

When the originating subscriber at substation 1S00 receives dial tone and dials, the dialed digits are registered in the originating register 1506. At the completion of dialing the register 1506 summons a marker 1505 through cable 15C15 and passes to it all the information necessary to complete the call, including a record of the line-to-register linkages and the identity of the calling and called subscribers. The marker 1505 releases the register 1506 and proceeds, after having ascertained that a linkage is available, to establish the line-to-trunk connection, which operation is referred to as callback.

A call-back call in conjunction with a concentrated line such as 1L00 is somewhat more complex than one in conjunction with an ordinary line which is not connected to a concentrator, because the line-to-trunk connection at the concentrator C0 is locked operated and must receive a distinct release signal in order to disconnect. For the ordinary line, the marker 1505 has direct control through the line link and trunk link frames of the linkages but such control is absent from the line-to-trunk connection through the concentrator C0. This connection must be released on each call-back call since the link which is selected by the marker 1505 for the line-to-trunk connection on callback is not necessarily the same as that used for the line-to-register connection, described above. Provision has therefore been made for applying a release signal on the selected trunk 4T0, which was utilized for the line-to-register connection, preceding the establishment of the call-back, or line-to-trunk linkage, whenever the switch linkage is released at the central office. In the concentrator system, described herein, the marker 1505 makes use of the recorded line linkages to release the line-to-register connection at the concentrator C0 before establishing the line-to-trunk connection.

When the marker 1505 is ready to establish the line-to-trunk linkage, it selects the line link frame, in which the concentrator C0 appears, in the regular manner, as described above and in the above-identified patent to Busch, and supplies decimal coded signals representing the identity of the calling line through the line link connector 1501 to the common control circuit 800. The marker 1505 also provides an indication that the operation is for a callback call through cable 15C10, the line link connector 1501 and cable 15C6 to the timing and connector circuit 1400. The circuit 1400 operates to delay the operation of the transfer circuit 8T0 in order to prevent the transmission of the identity of the calling subscriber from the control circuit 800 to the translator circuit 500 in the concentrator C0. The disconnect signal, hereinafter described, is identical to the seizure, or connect signal, which is supplied over the tip and ring of the selected one of trunks 4T0–9. For a connect operation, the control circuit 800 supplies the two-out-of-eight coded signals through the transfer circuit 8T0 to the concentrator C0 concurrent with the transmission of the seizure potential over the selected one of trunks 4T0–9. When the two-out-of-eight coded signals are not transmitted and the seizure potential alone is transmitted, it functions as a disconnect instead of a connect potential. The timing and concentrator circuit 1400 controls the transmission of the disconnect potential from the trunk control circuit 1300 and times the duration of the disconnect potential to allow for releasing the trunk circuit 1T0 in the concentrator C0. When the trunk circuit 1T0 receives the disconnect potential through the trunk 4T0 it opens the connection between the line 1L00 and the trunk 4T0.

The circuit 1400 also provides a release signal to circuit 700 which releases the connection from jack 7SOJ, and reoperates the circuit 300 to reestablish the connection from line 1L00 to trunk 300. At the end of the timing interval, the timing and disconnect circuit 1400 causes the trunk control circuit 1300 in circuit 11SIG0 to remove the disconnect potential from the trunk 4T0, and thereafter operates the transfer circuit 8T0 and the number group and transfer circuit 400, to permit the connection of the subscriber's line 1L00 to a newly selected one of the trunks 4T0–9. From this point on, the sequence of operation for callback is quite similar to the sequence of operation described above for supplying dial tone to the calling line. If trunk 4T9 is selected by the marker 1505 for the establishment of the connection, the timing and connector circuit 1400 causes the observation control circuit 700 to supply a release signal to circuit 300 and to connect jack 7SOJ to trunk 4T9 at the central office. It also causes the trunk control circuit 1300 to supply a connect potential over the trunk 4T9, and it causes the common control circuit 800 to concurrently supply the two-out-of-eight coded signals through the transfer circuit 8T0, the control leads 4C1–5 and the number group and transfer circuit 400 to the translator circuit 500. The translator circuit 500 functions to translate the two-out-of-eight direct-current code to a one-out-of-six and one-out-of-eight coded indication, and supplies it back to the number group and transfer circuit 400. The number group and transfer circuit 400 supplies this information to the trunk circuits 1T0–9 which, together with the connect potential on trunk 4T9, provides for a connection from the calling line 1L00 through the trunk circuit 1T9 to the trunk 4T9.

Mutual lockout occurs between the start circuit 1100 and the trunk control 1300 so that either service request or disconnect can occur at any one time. Whichever occurs first delays serving the other. Lockout also must exist between originating and terminating calls that occur simultaneously since the same concentrator control 290 is utilized in the central office. If the connect potential has not as yet been applied for an originating call, the trunk control circuit 1300 in conjunction with the start circuit 1100 provide a preference for the terminating call over the originating call. In general, as described above, all calls are treated as terminating calls when establishing the connections at the concentrators C0–9 and in the central office. Transmission of information from the concentrators C0–9 is generally limited to passing the calling line number to the central office, and thereafter the call is treated as a terminating call.

A terminating call to a concentrator line such as one of the lines 1S00–47, or 6S00–47, is completed by a marker 1505 in a manner very similar to that employed for a regular line appearance on a line link frame. Having obtained access to the frame through the line link connector 1501, the marker 1505 operates the control circuit 800 and the connector circuit 1400 through the line link connector 1501. The common control circuit 800 registers the identity of the terminating line and operates the transfer circuit 8T0 so that the identity of the terminating line may be transmitted to the concentrator C0. When the timing and connector circuit 1400 operates, it causes the observation control circuit 700 to release circuit 300 and connect jack 7SOJ to the selected one of trunks 4T0–9. It causes the trunk control circuit 1300 to supply the connect potential, at the same time that the two-out-of-eight direct-current coded signals are supplied from the common control circuit 800 through the transfer circuit 8T0 to the concentrator C0. If the terminating line is busy, the line circuit 200 supplies an indication thereof back through the control lead 4C5, the transfer circuit 8T0, the timing and connector circuit 1400, cable 15C6, the line link connector 1501 and cable 15C10 to the marker 1505. This indication to the marker 1505 that the line is busy causes the marker 1505 to dismiss the line link frame and the concentrator C0, and to proceed to return line busy tone to the distant calling subscriber.

If the terminating line is idle, a line busy indication is not provided to the marker 1505, and the marker 1505 operates the trunk control circuit 1300 through the cable 15C12, trunk frame 1503 and cable 15C7. The trunk control circuit 1300 thereafter functions to supply a connect potential to the concentrator C0 to close, or operate, the corresponding trunk circuit 1T0–9 associated with the selected one of trunks 4T0–9, in a manner similar to that described above for an originating call. If trunk 4T9 is selected, the connect potential operates circuit 1T9. When the trunk circuit 1T9 is operated, it provides an indication thereof to the connector circuit 1400 which causes the circuit 1300 to remove the connect potential and to complete the path from trunk 4T9 to trunk frame 1503. Since this is a terminating call, not an originating one, no visual indication is provided for the observation operator. The observation control circuit 700, however, controls the observation trunk circuit 300, as described above, to remove or disconnect trunk 3T0 from line 1L00. In general every time the marker 1505 selects the line link frame, the circuit 700 is readied, and every time the marker 1505 selects one of the trunks 4T0–9, the circuit 700 is operated to provide a connection from jack 7SOJ to the selected trunk and to release the circuit 300. Whenever the marker 1505 releases the selected trunk connection, the circuit 700 reestablishes the connection from line 1L00.

For a no-test call, the sequence of operations is somewhat different because if the line is busy the concentrator system of the present invention must provide the identity of the trunk 4T0–9 which is utilized for the line being tested. The no-test call commences as a terminating call except that an indication that the call is a no-test call is provided by the marker 1505 to the connector 1400. The direct-current coded signals, described above, are supplied to the concentrator C0. If the line, 1L00 for example, is idle, a connection is established thereto in the manner described above for a terminating call. If the line is busy, a busy indication is provided to the connector 1400 which supplies a no-test potential over through the transfer circuit 8T0 and lead 4C5 to the number group and transfer circuit 400.

Responsive to the no-test potential, the circuit 400 provides alternating-current simplex coded signals on a two-out-of-four basis representing the identity of one of the trunks 4T0–9 which is connected to line 1L00. The signals are provided over the control leads 4C2–4, through the transfer circuit 8T0 and the start circuit 1100 to the translator 1600. The coded signals are translated by the translator 1600 to a decimal indication of the trunk and sent through cable 15C5, the connector 1501 and cable 15C10 to the marker 1505.

When the marker 1505 receives the indentity of the utilized trunk, it connects the no-test connector 1504 through cable 15C8 and the trunk control circuit 1300 to the utilized one of the trunks 4T0–9 to bridge the established line-to-trunk connection which provided for the busy indication. After establishing this bridging connection, the marker 1505 releases, leaving the bridging connection locked to the connector 1504. The line-to-trunk connection is still controller by the calling and called subscribers, either of whom may initiate disconnect by hanging up.

DETAIL CIRCUIT DESCRIPTION

*Originating call*

Essentially the function performed by the concentrating system shown in Figs. 1 through 16, when arranged in accordance with Fig. 17, is to remove the function of the primary line switch frame of the No. 5 crossbar system from the central office to a remote point so as to reduce the conductor mileage connecting the subscribers to the central office. Each vertical group of the primary line switch becomes one of ten concentrators C0–9 in the concentrator system, wherein each of the concentrators C0–9 is connected by ten talking trunks, one observation trunk, and three control pairs to the central office and has connected thereto a maximum of 48 subscribers' lines. The detail circuit representation of concentrator C0 is shown in Figs. 1 through 5 with 48 substations 1S00–47 connected, respectively, through subscribers' lines 1L00–47 thereto. The concentrator C0 is in turn connected by means of the ten talking trunks 4T0–9, one observation trunk 3T0 and the three control pairs or six control leads 4C1–6 to the central office, which is shown in Figs. 7 through 16.

The concentrators C0–9 and the control 290 are connected into a crossbar telephone system of the type described in the Patent 2,585,904 which issued to A. J. Busch on February 19, 1952. The connectors 1504, 1500, 1501, the register 1506, the lockout circuit 1502, the marker 1505 and the trunk frame 1503 are standard components in crossbar systems.

In such crossbar telephone systems two basic types of switching frames are utilized; trunk frames such as trunk frame 1503 and line link frames. The frame 13LLF which is part of the trunk control circuits 1300 in the signal circuits 11SIG0–9 is equivalent to the secondary of the crossbar line link frame disclosed in the above-identified Busch patent. Ordinarily, subscriber lines are associated with the line link frames and all types of outgoing and incoming trunks are associated with the trunk frames. The general effect of the concentrators C0–9 and the control 290 is to remove the function of the primary line link frame to a remote point so as to reduce the conductor mileage connecting the subscribers to the central office. The concentrators C0–9 are in this manner inserted between the frames 13LLF in the circuits 1300 and the subscriber stations 1S00–47, 6S00–7, etc. Each vertical group of the ordinary primary line link switch or frame becomes one of the concentrators C0–9 in the concentrating system.

When the observation operator desires to observe on one of the concentrator subscriber lines, line 1L00 for example, switches 7SW1 and 7SW2 in the observation control circuit 700 are operated. The switches 7SW1 and 7SW2 provide for a connection from the observation control circuit 700 to any one of the ten observation trunks 3T0–9 and any one of ten cables 7C0–9, respectively. The switches 7SW1 and 7SW2 may be manual switches, keys, etc. as is well known in the art. The possible connections to trunks 3T0–9 and cables 7C0–9 are shown by dash lines. The switches 7SW1 and 7SW2 are positioned or operated by the observation operator to provide for a connection from the observation control circuit 700 to the trunk 3T0 and the cable 7C0 because the line 1L00 to be observed is connected to the concentrator C0. To observe on a line connected to the concentrator C0 trunk 3T0 and cable 7C0 are utilized. The switches 7SW1 and 7SW2, in this manner, select one of the concentrators C0–9. Thereafter the operator selectively operates the keys 7VF0–4 and 7HG0–9 in accordance with the identity of the subscriber's line to be observed. To observe on the subscriber's line 1L00, the key 7VF0 and the key 7HG0 are operated. With the keys 7VF0 and 7HG0 operated, the operator operates the service observing connect key 7SOC to provide for an observation connect potential to the concentrator C0. When the key 7SOC is operated, it provides ground through its operated armature 3 to the winding of the seizure relay 7SA which is also connected to the battery 7B2. With keys 7VF0, 7HG0 and 7SOC operated, the operation of relay 7SA in turn causes the operation of the relays 8HG0 and 8VF0 in the common control circuit 800 and the vertical group preference relay 11VGP0 in the start circuit 1100 in the signal circuit 11SIG0. The control circuit 800 is utilized in common for all ten of the concentrators C0–9 but the signal circuit 11SIG0 is individually associated with the concentrator C0. The signal circuits 11SIG1–9, of which the signal circuit 11SIG9 is shown functionally, are associated individually with the concentrators C1–9. The operating path for relay 8HG0 is from ground through the winding of relay 8HG0, the operated key 7HG0 and the operated armature 3 of relay 7SA to the battery 7B4, and the operating path for relay 8VF0 is from ground through the operated armature 2 of relay 7SA, the operated key 7VF0 and the winding of relay 8VF0 to battery 8B0. The operating path for relay 11VGP0 in the signal circuit 11SIG0 is from ground through the winding of relay 11VGP0, lead 1 through cable 7C0, the operated switch 7SW2, the operated armature 1 of key 7SOC and the operated armature 1 of relay 7SA to battery 7B4. The start circuit 1100 and the common control circuit 800 function to provide a positive potential for line numbers between 0 and 23 and a negative potential for line numbers between 24 and 47 through the central office transfer circuit 8T0 and control lead 4C6 to the number group and transfer circuit 400 in the concentrator C0.

When relay 11VGP0 is operated to indicate that the call or connection is to a line terminating in the concentrator C0, it in turn causes the operation of relay 11VGB0 over a path from ground through its winding, the operated armature 2 of relay 11VGP0 through the serially connected normal armatures 4 of the relays 13TP0–9 in the trunk control circuit 1300 to the battery 13B1 associated with the relay 13TP9. If any one of the ten relays 13TP0–9 is operated at this time, the relay 11VGB0 does not operate and the central office-to-concentrator signals hereinafter described from the control circuit 800 are delayed. One of the relays 13TP0–9 will be operated, as hereinafter described, during a terminating signaling operation from the central office. When one of the relays 13TP0–9 is operated, the observation connect sequence of operations is delayed.

The operation of relay 11VGB0 causes the operation of the relay 8TR0 in the transfer circuit 8T0 and relays 4TR and 4L0 in circuit 400 in the concentrator C0. The positive battery 10B1 in the control circuit 800 is connected through one of the resistors 10R, the operated armature 1 of relay 8VF0, the operated armature 3 of relay 8HG0, lead 8L8, the normal armature 5 of relay 14CB in the timing and connector circuit 1400, the operated armature 6 of relay 11VGB0, the winding of relay 8TR0, the control lead 4C6, the winding of relay 4TR, the varistor 4D11, which shunts the winding of relay 4HI preventing it from operating, through the winding of relay 4L0 and the normal armature 3 of relay 4NTA to ground. The relays 8TR0, 4TR and 4L0 in this manner are serially operated when relays 8HG0, 8VF0 and 11VGB0 operate. The battery potential applied through cable 4C6 is positive when the line number is between 00 and 23 and negative when it is between 24 and 47. In the illustrative example described herein, the line to be observed is line 1L00 so that the battery potential is positive. When the battery potential is negative or when the line number is between 24 and 47, the battery 10B2 instead of the battery 10B1 is connected through the control lead 4C6 to the concentrator C0.

The operation of the relays 8TR0 and 4TR also causes the operation of the relays 5A+ and 5C+ in the concentrator translator circuit 500 to register the line number indication which is sent on a two-out-of-eight direct-current signaling arrangement from the common control circuit 800. The chart in Fig. 21 indicates the selective operation of the relays 5A+, 5A−, 5B+, 5B−, 5C+, 5C−, 5D+ and 5D− in the translator circuit 500. For example, when relays 8HG0 and 8VF0 in the circuit 800 are operated, a path is provided from the battery 10B1 through one of the resistors 10R, the operated armature 2 of relay 8VF0, the operated armature 10 of relay 8HG0, the operated armature 1 of relay 8TR0, lead 4C1, the operated armature 1 of relay 4TR, lead 4L1 through the windings of relays 5A− and 5A+ to ground. The relays 5A+ and 5A− are shunted by the oppositely poled varistors 5V1 and 5V2, the junction of which is connected to the junction between the relays 5A+ and 5A−. The positive battery 10B1 causes the operation of the relay 5A+ and not of the relay 5A− which is substantially short-circuited by the varistor 5V2. In a similar manner a path is provided from the battery 10B1 to the relay 5C+ in the translator circuit 500 causing it to operate. The operating path for relay 5C+ is from battery 10B1 through one of the resistors 10R, the operated armature 4 of relay 8VF0, the operated armature 5 of relay 8HG0, the operated armature 3 of relay 8TR0, lead 4C3, the operated armature 3 of relay 4TR, lead 4L3 through the serially connected windings of relays 5C− and 5C+ to ground. Relays 5C− and 5C+ are shunted, in a similar manner as the relays 5A+ and 5A−, by a pair of oppositely poled varistors 5V5 and 5V6 which prevent relay 5C− from operating and allow relay 5C+ to operate. When a positive potential is provided over the control lead 4C6 from the central office, the line number is therefore sent over the control leads 4C1–5 on a two-out-of-eight signaling arrangement omitting the four combinations that require two signals on the same lead. This signaling system provides for a maximum of 24 possible combinations which are transmitted in accordance with the table or chart shown in Fig. 21. The number of possible combinations is doubled resulting in a maximum of 48 line numbers or combinations by utilizing either a + or a − signal on the control lead 4C6 to operate, as described above, either the relay 4L0 or the relay 4HI. This system of signaling results in a code easily checked, easily translated and without the need for marginal relay operation.

Direct-current signaling is always utilized from the central office to the concentrator C0, as is hereinafter described, in order to reduce the marker holding time necessary for establishing line-to-trunk connections.

The two-out-of-eight signaling method is most easily translated into an octal system which consists of the six number group relays 4E0–5 and the eight number group relays 4U0–7 in the number group and transfer circuit 400. One of the relays 4E0–5 and one of the relays 4U0–7 are operated upon the operation of two of the relays in the translator circuit 500. When the relays 5A+ and 5C+ are operated the relays 4E0 and 4U0 are operated. Relay 4E0 operates over a path from ground through the operated armature 4 of relay 5A+, the operated armature 5 of relay 5CT, the operated armature 1 of relay 4L0 and the winding of relay 4E0 to the battery 4B0, and relay 4U0 is operated over a path from ground through the operated armature 2 of relay 5A+, the operated armature 1 of relay 5C+, the winding of relay 4U0 to the negative battery 4B10. The contacts of the number group relays 4E0–5 and 4U0–7, as is hereinafter described, control the operation of the trunk circuits 1T0–9 which are used to establish a connection between any one of the talking trunks 4T0–9 and any one of the subscriber lines 1L00–47 and to control the operation of the observation trunk circuit 300.

When the number group relays 4E0 and 4U0 are operated, a line busy test is made of the line 1L00, and if one of the trunk circuits 1T0–9 is being utilized to established a connection from line 1L00, it supplies a line busy indication to the central office. When relays 4E0 and 4U0 operate, the line busy relay 14LB in the timing and connector circuit 1400 which is connected to the battery 14B5 is connected through the operated armature 5 of relay 8TR0, the control lead 4C5, the operated armature 5 of relay 4TR, the operated armature 10 of relay 4E0 and the operated armature 10 of relay 4U0 to the armatures 4 of the relays 1TE00, 1TE10, 1TE20, 1TE30 . . . and 1TE90. If any one of the trunk circuits 1T0–9 is being utilized to provide a connection from the line 1L00 to one of the talking trunks 4T0–9, a connection is provided through one of the relays 1TE(00, 10, 10 . . .). For example, if trunk circuit 1T0 has been operated the operating path from the winding of relay 14LB is extended through the operated armature 4 of relay 1TE00, the operated armature 6 of relay 1TU00 and the varistor 4D12 to ground causing relay 14LB to operate. When relay 14LB operates it provides a line busy indication through the cable 7C10 to the observation control circuit 700 to provide an indication to the observation operator that line 1L00 is busy. When relay 14LB operates, it connects ground through its operated armature 3, cable 7C10, the normal armature 1 of relay 7SB, the operated armature 4 of key 7SOC and lamp 7LBL to the battery 7B5 causing the energization of the lamp 7LBL. Responsive to the visual indication, the operator releases the horizontal group key 7HG0 and the vertical file key 7VF0 to release the start circuit 1100 and the control circuit 800 as is hereinafter described. When relay 14LB operates, it also prevents the transmission of a connect potential hereinafter described, over the tip and ring leads of trunk 3T0 to the concentrator observation trunk circuit 300. The operation of the armatures 1 and 2 of relay 14LB open the path from the battery 7B1 to the normal armatures of relay 7SB and also open the operating path for relay 7SB. The operating path for relay 7SB from battery 7B3 is through the winding of relay 7SB, the operated armature 2 of key 7SOC through the cable 7C10, the normal armature 1 of relay 14LB and the operated armature 4 of relay 7SA to ground. The relay 7SB which is slow to operate is delayed from operating until relay 14LB has a chance to operate. When the operator releases keys 7VF0 and 7HG0, as described above, the relays 8VF0, 8HG0 and 11VGP0 are in turn released. When relay 11VGP0 is released it in turn causes the release of relay 11VGB0. When the control circuit 800 in this manner releases, it in turn removes battery 10B1 causing the release of the transfer circuit 8T0 and relays 4L0 and 4TI in circuit 400. When relays 4TR and 8TR0 release they in turn release the relays 5A+ and 5C+ in the translator 500. When the translator 500 releases, it in turn releases the number group relays 4E0 and 4U0 in the circuit 400. Finally, the release of the relays 4E0 and 4U0 cause the release of the line busy relay 14LB which opens the operating path for the lamp 7LBL in the observation control circuit 700. When the operator releases the keys 7VF0 and 7HG0 the operator also releases the key 7SOC causing the relay 7SA to release returning the observation control circuit to normal.

If the line 1L00 is not busy, that is, not connected by one of the trunk circuits 1T0–9 to its associated one of the talking trunks 4T0–9, the line busy relay 14LB does not operate to energize the lamp 7LBL and prevent the connect operation as described above. If the relay 14LB remains normal indicating an idle line the relay 7SB operates as described above to connect the plus 200-volt potential source 7B1 through lamp 7L, cable 7C10, the normal armature 2 of relay 14LB back through the cable 7C10 through the operated armatures 2 and 3 of relay 7SB, the normal armatures 2 and 1 of the disconnect key 7DIS, resistors 7R1 and 7R2, the switch 7SW1 and trunk 3T0 to the observation trunk circuit 300. The tip lead 3TI and ring lead 3RI of trunk 3T0 are connected through the resistors 3R3 and 3R2, respectively, to the starting and main anodes of the gaseous triode 3CC. The cathode of tube 3CC is connected through the winding of the trunk relay 3TK to ground. The application of the positive 200-volt potential from battery 7B1 to the trunk 3T0 causes the cold cathode tube 3CC to ionize and the trunk relay 3TK to operate. The combination of the operation of the trunk relay 3TK together with one of the relays 4E0–5 and one of the relays 4U0–7, which are operated as described above, provides a path for operating one of the relays 3TU0–7 and one of the relays 3TE0–5 in the observation trunk circuit 300. With relays 3TK, 4E0 and 4U0 operated, operating paths are completed for relays 3TU0 and 3TE0 in circuit 300. The operating path for relay 3TU0 is from ground through the operated armature 1 of relay 3TK, the operated armature 16 of relay 4U0 and the winding of relay 3TU0 to battery 3B0. The operating path for relay 3TE0 is from ground through the operated armature 2 of relay 3TK, the operated armature 11 of relay 4E0 and the winding of relay 3TE0 to battery 3A0. There is only one set of relays 4E0–5 and 4U0–7 but there are ten sets of corresponding relays in the trunk circuits 1T0–9 and one set in the observation trunk circuit 300. In other words the selecting line signals from the number group and transfer circuit 400 are provided to all eleven of the trunk circuits 1T0–9 and 300. These signals in combination with a connect potential over one of the trunks 4T0–9 and 3T0 control the operation of the trunk circuits 1T0–9 and 300. During the observation connect sequence of operations, a connect potential, as described above, is provided over the trunk 3T0 so that only the observation trunk circuit functions to provide a connection from the line 1L00. When relays 3TU0 and 3TE0 in the trunk circuit 300 operate, the line 1L00 is connected through their serially connected armatures 1 and 2 to the normal armatures 1 and 2 of relay 3CT.

When relays 3TU0 and 3TE0 operate, the line busy relay 14LB in the circuit 1400 is operated as an indication of the crosspoint closure. The operating path for relay 14LB is from ground through the operated armature of relay 3TK, the operated armature 4 of relay 3TE0, the operated armature 6 of relay 3TU0, the operated armature 10 of relay 4U0, the operated armature 10 of relay 4E0, the operated armature 5 of relay 4TR, the operated armature 5 of relay 8TR0, through the winding of relay 14LB to battery 14B2. When the relay 14LB operates, it energizes the connect lamp 7CTL in the observation control circuit 700 to indicate that the connection is established. The operating path for the connect lamp 7CTL from battery 7B5 is through the lamp 7CTL, the operated armature 5 of key 7SOC, the operated armature 1 of relay 7SB through cable 7C10 and the operated armature 3 of relay 14LB to ground.

Responsive to the visual indication provided by lamp 7CTL, the operator releases the keys 7VF0, 7HG0 and 7SOC. When the keys 7VF0 and 7HG0 are released, they in turn release the common control circuit 800 and the start circuit 1100, in a similar manner as described above, to in turn release the transfer circuit 8T0, the translator 500 and the number group and transfer circuit 400. The relays 3TU0 and 3TE0 remain locked to ground through their operated armatures 5 and 3, respectively, and the back contacts of the normal armatures 1 and 2 of relay 3TK. Relay 3TK returns to normal when relay 7SB releases. Relay 7SB releases after relay 7SA releases by having its operating path through the armature 3 of key 7SOC open. When relay 7SB releases, it also causes the operation of the connect relay 3CT in the observation trunk circuit 300. The operating path for the relay 3CT is from ground through the winding of relay 3CT, the varistor 3V, the tip lead 3TI of trunk 3T0, the switch 7SW1, resistor 7R1, the normal armature 2 of key 7DIS, the normal armature 2 of relay 7SB and the serially connected normal armatures 1 of relays 7TC0–9 through lamp 7L2 to the minus 48-volt potential source 7B6. When relay 3CT operates, it connects the line 1L00, which has been extended through the operated armatures 1 and 2 of relays 3TU0 and 3TE0, through its operated armatures 1 and 2 to the service observing trunk 3T0. The tip lead 3TI is connected in series with a capacitor 3C shunted by the resistor 3R1 at the concentrator C0 to provide transmission balance while isolating the line and trunk for direct-current signaling. The ring 1R00 of the subscriber's line 1L00 is now connected through the serially connected armatures 2 of relays 3TU0, 3TE0 and 3CT to the ring 3RI of trunk 3T0 to the control circuit 700. At the circuit 700, the ring lead 3RI is connected through the switch 7SW1, resistor 7R2, the normal armature 1 of relay 7DIS, the normal armature 3 of relay 7SB, the serially connected normal armatures 2 of relays 7TC0–9 to the jack 7SOJ. The ring lead path provides means of signaling the service observing operator as soon as the subscriber of station 1S00 lifts the telephone receiver. When the subscriber of station 1S00 lifts his receiver, ground through the right armature of the cut-off relay 2C00 is connected through the substation 1S00 to the ring lead 1R00 and thence to the jack 7SOJ as an indication of the origination of the service request.

After the observation operator releases the keys 7HG0 and 7VF0, the keys 7H0 and 7V0 are operated and left operated so long as it is desired to observe on line 1L00. The operation of the keys 7H0 and 7V0 ready circuits from the control circuit 800, as is hereinafter described, for establishing a connection from the jack 7SOJ to a selected one of the talking trunks 4T0–9 when a call is originated on the line 1L00.

When a call is originated on the line 1L00, a sequence of operations is initiated for establishing a connection from line 1L00 through concentrator C0 and one of the talking trunks 4T0–9 to an originating register 1506 in the central office. At the same time, the observation operator is signaled over the ring lead 3RI of trunk 3T0 and thereafter a connection is established from the observation jack 7SOJ through the trunk control circuit 1300 to the selected one of the trunks 4T0–9 while the bridging connection through trunk 3T0 at the observation trunk circuit 300 is removed.

When a call is originated at the substation 1S00, an individual associated line relay 2L00 in the line circuit 200 is operated to indicate the demand for service. When the call is originated at the substation 1S00, a path is completed from ground at the right normal contact of the cut-off relay 2C00 through the tip lead 1T00 of the line 1L00, the substation 1S00, the ring lead 1R00 of the line 1L00, the left normal contact of relay 2C00 and the winding of line relay 2L00 to the battery 2B00 causing relay 2L00 to operate. The operation of the line relay 2L00 in the line circuit 200 initiates the operation of the line lockout and identifier circuit 201 to lock out the other 47 line relays 2L01–47 and to identify the calling line 1L00.

The line lockout and identifier circuit 201 has ten units relays 2LU0–9 and five tens relays 2LT0–4 which identify the calling line on a decimal basis. When relay 2L00 in the line circuit 200 is operated, an operating path for the units relay 2LU0 is closed from the battery 4B18 in the number group and transfer circuit 400 through the normal contact 1 of the relay 4NTA, lead 4A1, the winding of relay 2LU0 through the operated left armature of relay 2L00 and the resistor 2R1 to the negative potential source 2B48. The resistor 2R1 is shunted by the series circuit comprising the diode 2U0 and the lockout impedance 2LOU. In this manner the left armature of each of the line relays 2L00–47 is connected in series with the winding of one of the line units relays 2LU0–9 corresponding to the units number of the calling line. The impedance of the resistor 2R1 is relatively large in comparison with the impedance of the winding of relay 2LU0 so that most of the voltage provided by the battery 4B18 and the battery 2B48 is thereacross. This potential difference is also across the diode 2U0 and the lockout impedance 2LOU causing the diode 2U0 to ionize. When the diode 2U0 ionizes, it substantially short-circuits the resistor 2R1 and allows the relay 2LU0 to operate. By virtue of the negative impedance characteristic exhibited by the cold cathode tube or diode 2U0 and the fact that the lockout impedance 2LOU is connected to each of the diodes 2U0–9, only one of the line units relays 2LU0 can operate.

For efficient transmission of a calling line number from the concentrator to the central office, an encoding process is necessary. The encoder in turn must be acted on by only one line at a time; otherwise false numbers may be transmitted. This requires a lockout circuit at the concentrator C0. Simultaneous closure of the paths to two or more of the diodes 2U0–9 would cause them to start conducting. The total circuit current can only increase slowly however, due to the presence of inductance of the impedance 2LOU in the common ground lead. This would cause the diodes to pass through their negative impedance region slowly. As it is a virtual impossibility for the negative impedance characteristics of the transistors to be identical, the total impedance around the loops of the conducting units would be negative thereby causing loop currents to flow. This current would be in the direction of increasing the current flow through one of the diodes 2U0–9 and decreasing and finally extinguishing the current flow through the others. When the current through the common circuit builds up to its final value, the voltage drop across the common impedance 2LOU prevents any other unit from attaining its conducting condition.

When the relay 2LU0 operates, it prepares an operating path for the line tens relay 2LT0 from the lead 301 through the winding of relay 2LT0, the operated right armature of relay 2LU0 and resistor 2R2 to the battery 2B49. The impedance of the resistor 2R2 is substantially greater than the impedance of the winding of the relay 2LT0 so that the relay 2LT0 does not operate at this time. The operation of relay 2LU0 closes a shunting path through its operated armature 3, the diode 2T0 and the impedance element 2LOT to the battery 2B50. The diode 2T0 ionizes and substantially short-circuits the resistor 2R2 allowing the relay 2LT0 to operate. Due to the impedance element 2LOT which is connected in series with the five diodes 2T0–4, only one of the line tens relays 2LT0–4 can operate at any one time. In this manner the tens and the units digits of the calling line number are established and the other 47 lines are locked out.

The operation of relays 2LU0–9 and 2LT0–4 in the line lockout and identifier circuit 201 provides a translation of the registered decimal indication of the calling line to a two-out-of-four code for the tens digit and a two-out-of-five code for the units digit in accordance with the hereinafter described table, shown in Fig. 20. The translated identification of the calling line is supplied, as is hereinafter described, through leads 2C1 and 2C2, the number group and identifier circuit 300, and the control leads 4C1–6 to the central office.

The operation of the line lockout and identifier circuit 201 grounds selected ones of the leads 2C1 and 2C2 which connect the line lockout and identifier circuit 201 to the signal number group and transfer circuit 400. There are four leads 2C1 which provide the tens indication and there are five leads 2C2 which provide the units indication. In the illustrative example described above, when the call is originated at the substation 1S00, and the units relay 2LU0 and the tens relay 2LT0 have been operated, ground is applied to the diodes 4D8, 4D6, 4D2 and 4D1 which are connected to the leads 2C1 and 2C2. The diode 4D8 is grounded through a lead 2C1 and the operated armature 2 of relay 2LT0; diode 4D6 is grounded through a lead 2C1 and the operated armature 1 of relay 2LT0; diode 4D2 is grounded through a lead 2C2 and the operated armature 1 of relay 2LU0; and diode 4D1 is grounded through a lead 2C2, the operated armature 2 of relay 2LU0, lead 2A1 and the normal armature 2 of relay 4NTA. The grounding path for diode 4D1 is through a normal armature of relay 4NTA because the control lead 4C5, to which diode 4D1 is connected, is utilized during the no-test sequence of operations. During no-test the control lead 4C5 functions as a locking ground path from a positive source of potential 14B4 for the no-test relays 4NT0–9. It is necessary therefore to remove the possible connection through the positively poled diode 4D1 during no-test so that the no-test locking ground through lead 4C5 functions properly. The originating signaling from the concentrator C0 is delayed when a no-test call is made due to the removal of the positive battery 4B18 at the armature 3 of relay 4NTA from the lockout and identifier circuit 201. The battery 4B18 as described above is the operating source of potential for the relays 2LU0–9 and 2LT0–4 in the circuit 201. The diodes 4D9 through 4D1 are connected through the normal contacts of the armatures 1 through 5 of the transfer relay 4TR and the control leads 4C1–5 to the central office. The diodes 4D1, 4D2, 4D4, 4D6 and 4D8 are poled in the direction of positive current from the central office and the diodes 4D3, 4D5, 4D7 and 4D9 are poled in the direction of negative current from the central office. Due to the operation of the line lockout and identifier circuit 201 as described above, the diodes 4D8, 4D6, 4D2 and 4D1 are grounded.

Figure 16:
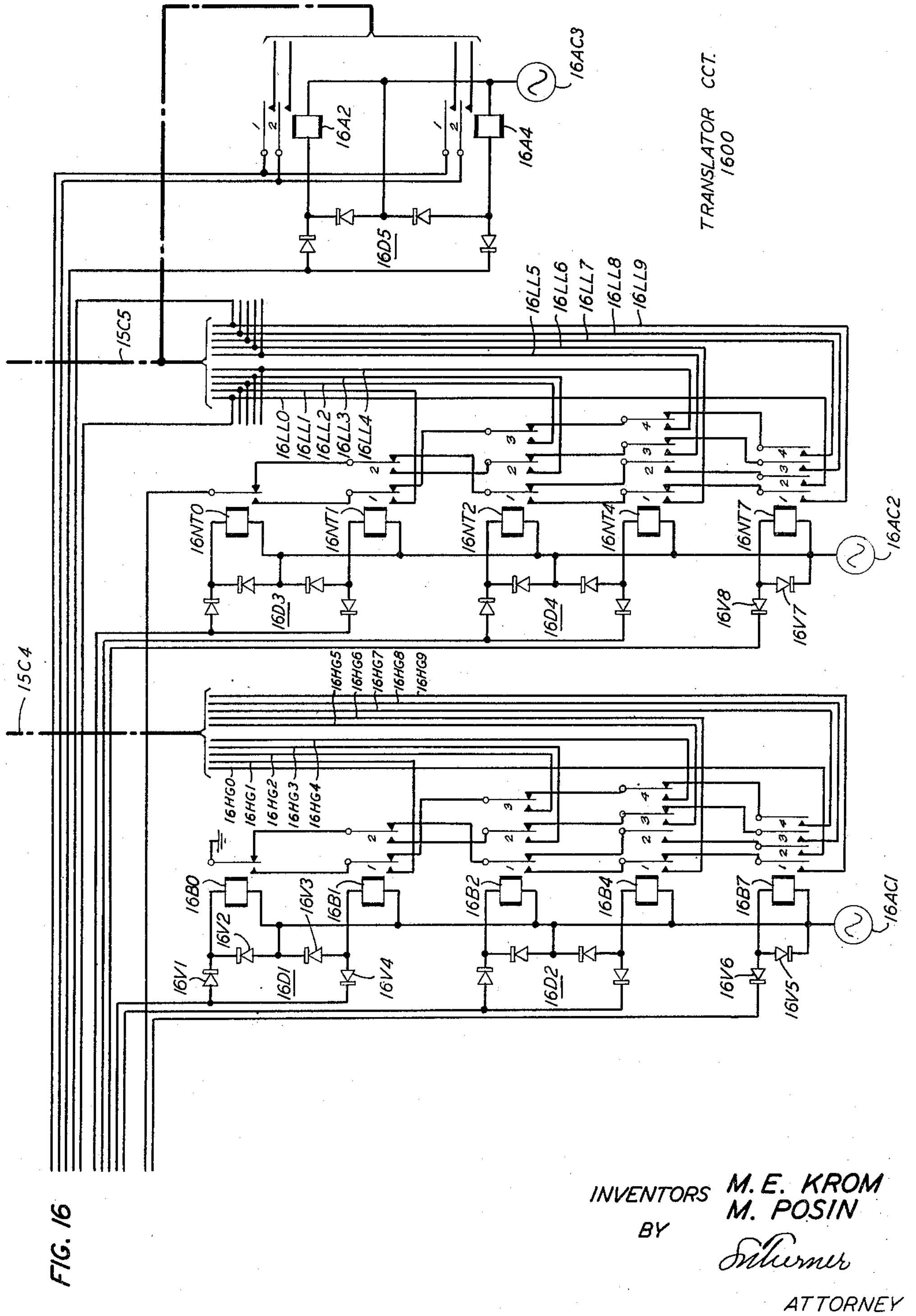
Fig. 16 illustrates a translator circuit in the central office.

The control leads 4C1–5 are connected through the normal armatures 1 through 5 of the relay 8TR0 in the transfer circuit 8T0 to the start circuit 1100. As described above there are ten start circuits 900, one in each of the signal circuits 11SIG0–9, which are associated respectively with the concentrators C0–9. The detail circuits of the central office concentrator control 290, which is indicated in the functional circuits shown in Figs. 16 and 17, are shown on Figs. 7 through 14 and 16. The concentrator control 290 has ten transfer circuits 8T0–9 and ten signal circuits 11SIG0–9 with the remaining circuits such as the control circuit 800, the timing and connector circuit 1400, the observation control circuit 700, and the translator 1600, being common to all ten concentrators C0–9. The control leads 4C1–5 which are individual to the concentrator C0 are connected through the transfer circuit 8T0 through the normal armatures 1 through 4 of the relay 11NTR0 in the start circuit 1100 to the now normal armatures 1 through 4 of the relay 11VGA0. The ground connection therefore provided by the line lockout and identifier circuit 201 does not complete at this time a path through the control leads 4C2–5 since relay 11VGA0 has not as yet been operated. The lead 4C1, however, is connected respectively through the oppositely poled diodes 11V1 and 11V4 to the relays 11A0 and 11A1. The same terminals of the relays 11A0 and 11A1 are connected together through the diodes or varistors 11V2 and 11V3 which are poled in a direction of positive current from the relay 11A1 to the relay 11A0. The other terminals of the relays 11A0 and 11A1 are connected to the alternating-current potential source 11AC which is also connected to the junction of the varistors 11V2 and 11V3.

When ground is applied by the concentrator C0 to the lead 4C1 the alternating-current source 11AC operates one or the other or both of the relays 11A0 and 11A1 depending upon which one or both of the diodes 4D8 and 4D9 in the signal and transfer circuit 400 have been grounded by the line lockout and identifier circuit 201. In the illustrative example described herein the diode 4D8 was grounded to allow positive current from the central office. When positive current from the central office is utilized, relay 11A1 operates through the varistor 11V4 but relay 11A0 does not operate due to the inhibition by the varistor 11V1.

The signals provided by the concentrator C0 through the control leads 4C1–5 as described above for the lead 4C1 and as hereinafter described for the leads 4C2–5 are illustrated in the table shown in Fig. 20. For a line tens indication of zero, as described above in the illustrative example, a positive current from the central office through lead 4C1 is provided, and also as hereinafter described positive current from the central office through the control lead 4C2. At least one of the relays 11A0–1 operates for any line tens indication as shown in the chart of Fig. 20. The operation of relay 11A0 or 11A1, as is hereinafter described, operates a lockout circuit 1502, provides a start signal and indication of the identity of the line link frame and vertical group to the line link marker connector 1500 and also functions as part of a translator circuit 1600. When relay 11A1 operates, it provides ground through its operated armature 3 and cable 15C1 to the lockout circuit 1502 which locks out the signal circuits 11SIG1–9. Locking out the signal circuits 11SIG1–9 effectively locks out the concentrators C1–9 so that originating calls therefrom are not serviced during the service of the originating call from the substation 1S00 connected to the concentrator C0. Since the line lockout and identifier 201, as described above, locked out the other 47 subscriber lines 1L01–47 which are connected to concentrator C0 and lockout circuit 1502 locks out the other nine concentrators C1–9, only the call originated on line 1L00 is serviced. The marker 1505 requires an indication from the lockout circuit 1502 through cable 15C11 in order to proceed with setting up the call.

The operation of relay 11A1 also provides a start signal through its operated armatures 1 and 2 from the lockout circuit 1502 through the cable 15C1 and the cable 15C3 to the line link marker connector 1500. The line link marker connector 1500 which is disclosed in the above-identified patent to Busch functions to call in a marker 1505 to service the call originated at the substation 1S00. When relay 11A1 operates, it also provides a vertical group test lead indication by providing ground through its operated armature 4 and the cable 15C3 to the line link marker connector 1500 to indicate the vertical group number or the concentrator identity since each concentrator C0–9 replaces a vertical group. The operation of the armatures 1 and 2 of relay 11A1 provides to the marker 1505 a start signal and also an indication through the line link marker connector 1500 of the identity of the line link frame in which the concentrator C0 appears. Two pieces of information are therefore supplied to the marker 1505 upon the operation of one of the relays 11A0 or 11A1 in the start circuit 1100; one is the line link frame identity and the other is the vertical group identity which is the concentrator identity. Having this information the marker 1505, over a path through cable 15C9, the line link marker connector 1500 and cable 15C3, operates the vertical group relay 11VGA0 which corresponds to the concentrator C0 in the line link frame in which the concentrator C0 appears. Only one line link frame is shown in Figs. 1 through 16 and each line link frame would include ten concentrators C0–9.

When a marker 1505 is seized it causes the line link marker connector 1500 to operate the vertical group relay 11VGA0 which connects the translator circuit 1400 to the control leads 4C2–5. As described above the control leads 4C2–5 were connected through the normal armatures 1 through 4 of relay 11NTR0 to the armatures 1 through 4 of the relay 11VGA0. When the relay 11VGA0 operates, it extends the connection from the concentrator C0 through leads 4C2–5 to the translator circuit 1600. The translator circuit 1600 comprises a series of relay groups which are somewhat similar to the relay group consisting of relays 11A0–1 in the start circuit 1100. The relays 11A0 and 11A1 function together with the relays 16A2 and 16A1 to indicate the line tens indication and the relays 16B0, 16B1, 16B2, 16B4 and 16B7 function to indicate a line units indication. The relays 16B0 and 16B1 are connected through the varistor circuit 16D1 to the control lead 4C3; the relays 16B2 and 16B4 are connected through the varistor circuit 16D2 to the control lead 4C4 and the relays 16A2 and 16A4 are connected through the varistor circuit 16D5 to the control lead 4C2. Each of the varistor circuits 16D1–5 include four varistors 16V1–4 which are connected in a manner similar to that described above for the varistors 11V1–4 which are associated with the relays 11A0 and 11A1. In accordance with the signals provided by the concentrator C0, as shown in Fig. 20 and described above, when relay 11VGA0 operates it provides for the operation of the relays 16A4, 16B4 and 16B7. The relay 16B7 is shunted by the varistor 16V5 and is connected to the control lead 4C5 through the varistor 16V6 which is poled in a direction of positive current from the central office. The operating path for the relay 16A4, for example, is from the alternating-current source 16AC3, the winding of relay 16A4, varistor 16V4 of the diode circuit 16D5, the operated armature 1 of relay 11VGA0, the normal armature 1 of relay 11NTR0, the normal armature 1 of relay 8TR0, control lead 4C1, the normal armature 1 of relay 4TR, diode 4D8 and the operated armature 2 of relay 2LT0 to ground. In this manner the operation of the translator circuit 1600 together with the operation of the relays 11A0–1 in the start circuit 1100 provide for a registration of the signals supplied from the concentrator C0 which indicate the identity of the substation from which a call is being originated.

In the illustrative example described herein the call is originated at the substation 1S00 and current from the central office is through the control leads 4C1 and 4C2 to indicate a line tens digit 0 and through the control leads 4C4 and 4C5 to indicate a line units digit, also of 0. The relays in the translator circuit 1600 that are operated may be readily determined from the chart shown in Fig. 20. For the control lead 4C1 a+ indicates that the relay 11A1 is operated and a— indicates that the relay 11A0 is operated; for the lead 4C2 a+ indicates that relay 16A4 is operated and a— indicates that the relay 16A2 is operated; for lead 4C3 a+ indicates that relay 16B1 is operated and a— indicates that relay 16B0 operates; for the lead 4C4 a+ indicates that the relay 16B4 is operated and a— indicates that the relay 16B2 is operated; and finally for the lead 4C5 a+ indicates that the relay 16B7 is operated.

When a call is originated from the substation 1S00, therefore, the following relays are operated; relays 11A1, 16A4, 16B4 and 16B7. The operation of the relays 11A1 and 16A4 provides an indication of the vertical file, which is 0, to the line link connector 1501 and thence through cable 15C5 to the marker 1505. The vertical file indication is provided by connecting ground at the operated armature 6 of relay 11A1, through the operated armature 6 of relay 11VGA0, and the operated armature 1 of relay 16A4 to the line link connector 1501. Two of the four relays 11A0, 11A1, 16A2 and 6A4 operate to indicate the tens digit or vertical file 0 through 5. In a similar manner two out of five of the relays 16B0, 16B1, 16B2, 16B4 and 16B7 operate to indicate one of the ten line units digits 0 through 9 as a horizontal group indication. With the relays 16B4 and 16B7 operated, ground is connected through the normal armature of relay 16B0, the normal armature 2 of relay 16B1, the normal armature 1 of relay 16B2, the operated armature 2 of relay 16B4, the operated armature 2 of relay 16B7, the lead 16HG0 and cable 15C4 to the line link marker connector 1500. In this manner the operation of the relays 11A0, 11A1 and the relays in the translator circuit 1600 perform a translation from the two-out-of-four and two-out-of-five codes from the concentrator C0 to one-out-of-five and one-out-of-ten decimal codes. The decimal indications are passed from the connectors 1501 and 1500 to the marker 1505 as vertical file and horizontal group indications, respectively.

Briefly summarizing, the identity of the line units digit is provided as a horizontal group indication through the cable 15C4, the line link marker connector 1500 and the cable 15C9 to the marker 1505 and the line tens digit is provided as the vertical file indication through the cable 15C5 or 15C2, the line link connector circuit 1501 and cable 15C10 to the marker 1505. The marker 1505 now has the line link frame identification, the vertical group or concentrator identification, the horizontal group or line units identification and the vertical file or line tens identification.

When the marker 1505 has obtained this information and connected to the line link frame, including control 290, through the line link connector 1501, it operates the common control circuit 800 in accordance with the vertical file and horizontal group information received from the concentrator control 290 and also selects one of the trunks 4T0–9. The marker 1505 operates one of the ten horizontal group relays 8HG0–9 and one of the five vertical file relays 8VF0–4 in accordance with the horizontal group and vertical file information over a path through the cable 15C10, the line link connector 1501 and cable 15C2. At the same time that one of the horizontal group relays 8HG0–9 and one of the vertical file relays 8VF0–4 in the common control circuit 800 are operated, the marker 1505 operates one of the ten vertical group preference relays 11VGP0–9 in the start circuits 1100. In the illustrative example described herein the relays 8HG0, 8VF0 and 11VGP0 are operated. Relay 8VF0 is operated from the line link connector 1501 over a path through the cable 15C2, the winding of relay 8VF0 to battery 8B1; relays 8HG0 and 9VGP0 are operated over a path from ground through its winding over a path through the cable 15C2 to the line link connector 1501. The operation of relay 11VGP0 indicates that the call being serviced is from or to a substation connected to concentrator C0 and the operation of relays 8HG0 and 8VF0 indicate the identity of the substation. Since the marker 1505 has received from the concentrator C0 all the information necessary for setting up the call and recorded this information in the common control circuit 800 and signal circuit 11SIG0, the control leads 5C1–5 which were utilized for receiving this information from the concentrator C0 can now be used for setting up the connection thereat. When relay 11VGP0 is operated it in turn causes relay 11VGB0 to operate over a path from ground through its winding, the operated armature 2 of relay 11VGP0, through the serially connected normal armatures 4 of the relays 13TP0–9 to the battery 13B1. If any one of the ten relays 13TP0–9 is operated at this time, the relay 11VGB0 does not operate and central office-to-concentrator signals, hereinafter described, are delayed. One of the relays 13TP0–9 will be operated as hereinafter described during disconnect so that if a disconnect sequence of operations is taking place and one of the relays 13TP0–9 is operated, servicing of the originating call from one of the subscribers' lines connected to the concentractor C0 is halted or delayed. In a similar manner also as hereinafter described, if the relay 11VGB0 is first operated the operation of the relay 13TP0–9 does not occur and the disconnect sequence of operations is delayed.

The operation of the relay 11VGB0 causes the operation of relay 7C in the observation control circuit 700, relay 8TR0 in transfer circuit 8T0, and relays 4TR and 4L0 in circuit 300 in concentrator C0. Relay 7C operates over a path from ground through the operated armature 17 of relay 8HG0, the operated key 7H0, the winding of relay 7C, the switch 7SW2, through the lead 3 of cable 7C0, the operated armature 1 of relay 11VGB0, lead 2 of cable 7C0, switch 7SW2, the operated key 7V0 and the operated armature 11 of relay 8VF0 to battery 8A0. When relay 7C operates it readies operating paths for the relays 7TC0–9 to the timing and connector circuit 1400. When, as is hereinafter described, the marker 1505 selects one of the talking trunks 4T0–9 the circuit 1400 is operated and in turn operates one of the relays 7TC0–9. The relays 7TC0–9 are individually associated with the trunks 4T0–9 with, for example, relay 7TC0 being operated when trunk 4T0 is selected.

Relays 8TR0, 4TR and 4L0 are serially operated over a path from battery 10B1 through a resistor 10R, the operated armature 1 of relay 8VF0, the operated armature 3 of relay 8HG0, the normal armature 5 of relay 14CB, the operated armature 6 of relay 11VGB0, the winding of relay 8TR0 in the transfer circuit 8T0, the control lead 4C6, the winding of the relay 4TR, the varistor 4D11 which shunts the winding of relay 4H1, preventing it from operating, through the winding of the relay 4L0 and the normal armature 3 of relay 4NTA to ground. The relays 8TR0, 4TR and 4L0 are therefore serially operated upon the operation of relays 8HG0, 8VF0 and 11VGB0 in a similar manner as described above during the observation connect sequence of operations. As described above the battery potential applied through cable 4C6 will be positive if the line number being serviced is between 00 and 23 and negative if it is between 24 and 47. In the illustrative example described herein the call is originated from the substation 1S00 so that the line number is 00 and the battery potential applied is positive. When the line number is between 00 and 23 battery 10B1 is connected to lead 4C6 and the relay 4L0 is operated in series with the relays 4TR and 8TR0 as an indication thereof. When the line number is between 24 and 27 battery 10B2 is connected to lead 4C6 through one of the resistors 10R and relay 4H1 is operated instead of relay 4L0.

When relays 4TR and 8TR0 operate, the operating paths for relays 11A1, 16A4, 16B4 and 16B7 are opened causing them to release and return the translator 1600 to normal.

The operation of the relays 8TR0 and 4TR also causes the operation of the relays 5A+ and 5C+ in the translator circuit 500 to register the line number indication which has been sent on a two-out-of-eight signaling arrangement from the common control circuit 800 in the central office. The signaling from the central office to the concentrators C0–9, as described above, is always direct-current signaling whereas the signaling from the concentrators C0–9 is alternating-current simplex signaling. The chart in Fig. 21, also as described above, indicates the selective operation of the relays 5A+, 5A—, 5B+, 5B—, 5C+, 5C—, 5D+ and 5D— in the translator circuit 500. For example, when the relays 8HG0 and 8VF0 in the circuit 800 are operated, a path is provided from the battery 10B1 through one of the resistors 10R, the operated armature 2 of relay 8VF0, the operated armature 10 of relay 8HG0, the operated armature 1 of relay 8TR0, lead 4C1, the operated armature 1 of relay 4TR, lead 4L1 through the windings of relays 5A— and 5A+ to ground. The positive battery 10B1 causes the operation of the relay 5A+ and not of the relay 5A— which is substantially short-circuited by the varistor 5V2. In a similar manner a path is provided from the battery 10B1 to the relay 5C+ in translator circuit 500 causing it to operate. The operating path for relay 5C+ is from battery 10B1 through one of the resistors 10R, the operated armature 4 of relay 8VF0, the operated armature 5 of relay 8HG0, the operated armature 3 of relay 8TR0, lead 4C3, the operated armature 3 of relay 4TR, lead 4L3 through the winding of relay 5C+ to ground. The line number is therefore sent over the control leads 4C1–5 on a two-out-of-eight signaling arrangement omitting the four combinations that require two signals on the same lead.

Direct-current signaling is utilized from the central office to the concentrator to reduce the marker holding time necessary for establishing line-to-trunk connections. Marker holding time is an expensive item in crossbar telephone systems due to the cost of a marker 1505. In fact, marker holding is generally valued at more than 60 dollars per millisecond per marker. The number of markers 1505 that is utilized in a marker group depends upon the number of lines and the marker holding time for servicing a call. The marker holding time for obtaining dial tone or for establishing a line-to-register connection in the No. 5 crossbar system described in the above-identified patent to Busch is approximately four tenths of a second. If the signaling system from the central office to the concentrator C0 were to take 30 or 40 milliseconds it would increase the marker holding time 10 percent or increase by at least 10 percent the number of markers 1505 needed in a marker group. The alternating-current simplex signaling system, for example, which is utilized in the concentrator system of the present invention to signal from the concentrators C0–9 to the central office has a relatively lengthy signaling duration: the translator circuit 1600 requires approximately 32 milliseconds. The alternating-current simplex signaling is utilized to signal from the concentrators C0–9 to the central office because the marker 1505 at that time is not being held so that increased marker holding time is not a factor and such a system avoids the utilization of additional potential source at the concentrators C0–9. If direct-current signaling were utilized, for example, in signaling from the concentrators C0–9, a positive and negative potential source would have to be supplied at each of the concentrators C0–9 or supplied thereto, with accompanying power dissipation, from the central office.

The direct-current signals cause the translator 500 to operate in approximately 6 milliseconds which results in a relatively small increase in marker holding time.

Another factor in determining the use of direct-current signaling from the central office in addition to marker holding time is the desire to restrict the number of control leads. Alternating-current simplex signaling, as described above, utilizes the five control leads 4C1–5 whereas the direct-current signaling utilizes only the four control leads 4C1–4. The operation of the relays 4L0 and 4HI is over the transfer control lead 4C6 which is utilized for the transfer function. The fifth lead 4C5 which is not utilized to signal the identity of the line from the central office to the concentrator C0 is utilized, as is hereinafter described, for no-test and also busy test signaling. If all five control leads 4C1–5 were utilized to signal from the central office an additional control lead would be necessary for the no-test and busy test signals.

The two-out-of-eight signal method, described above, is most easily translated into an octal system which consists of the six relays 4E0–5 and the eight relays 4U0–7 in the number group and transfer circuit 400. One of the relays 4E0–5 and one of the relays 4U0–7 are operated upon the operation of two of the relays in the translator circuit 500. When the relays 5A+ and 5C+ are operated, the relays 4E0 and 4U0 are operated with relay 4E0 operating over a path from ground through the operated armature 4 of relay 5A+, the operated armature 5 of relay 5C+, the operated armature 1 of relay 4L0 and the winding of relay 4E0 to the battery 4B0. Relay 4U0 is operated over a path from ground through the operated armature 2 of relay 5A+, the operated armature 1 of relay 5C+, the winding of relay 4U0 to the negative battery 4B10. The contacts of the number group relays 4E0–5 and 4U0–7, as described above, are used to make busy tests by readying an operating path for the line busy relay 14LB and to control the operation of the trunk circuits 300 and 1T0–9 which are used to establish a connection between one of the trunks 3T0 and 4T0–9 and the calling subscriber's line 1L00.

At the same time that the marker 1505 was connected to the line link frame in which the concentrator C0 appeared and operated the vertical group relay 11VGB0, it also obtained access to the leads 16LL0–9 and the line busy leads 11LB0–9 through the cables 15C5 and 15C2, respectively, and the line link connector 1501 for selecting an idle link or trunk 4T0–9 to be used in setting up the call. When the marker 1505 selects an idle link which is indicated by the absence of ground on the corresponding one of the leads 16LL0–9 and 11LB0–9 it proceeds to connect a source of potential, not shown, to the associated one of the select magnets 14SM0–9 and applies ground to one of the hold magnets 13HM0–9. Ground is applied through cable 15C7 to operate one of the hold magnets 13HM0–9 connected to batteries 13B13 to connect upon the operation of one of the select magnets 13SEL0–9 the horizontals of the frame 13LLF to the trunk frame 1503. For example, when the marker 1505 selects the idle link or trunk 4T9 after determining in the absence of ground upon leads 16LL9 and 11LB9 that it is idle, it connects a source of potential through the cable 15C10, the line link connector 1501, the cable 15C6, the lead 14S9, the winding of the select magnet relay 14SM9 through the ninth normal contact A of the relay 14XSM to ground causing the relay 14SM9 to operate. Immediately thereafter the marker 1505 applies ground through the cable 15C10, the line link connector 1501 and the cable 15C2 to one of the line hold leads 8LH0–4 to operate the line hold relay 14LH in the connector circuit 1200. In the No. 5 crossbar system of the type disclosed in the above-identified patent to Busch, there is one line hold relay for each vertical file so that ordinarily five line hold relays would be utilized. In the concentrator control circuit 800, however, the leads 8LH0–4 are grouped together after passing through armatures 9 of the vertical file relays 8VF0–4 and are used to operate the common line hold relay 14LH. Only one line hold relay 14LH is used because only one call at a time is handled by the concentrator control 290. In the illustrative example described above, the originating call identifying number is 00 so that the marker 1505 applies ground to the lead 8LH0 in accordance with a vertical file indication of 0. The lead 8LH0 is connected through the operated armature 9 of relay 8VF0, the normal armature 2 of the line busy relay 14LB and the winding of relay 14LH to the battery 14B3.

When the relay 14SM9 operates, it in turn causes the operation of the select magnet 13SEL9 which is a part of the crossbar switch or line link frame generally designated as 13LLF in the trunk control circuit 1300. The operating path for the select magnet 13SEL9 is from ground through the winding of the magnet 13SEL9, the operated ninth armature D of relay 11VGB0, the operated armature 2 of relay 14SM9 and the lamp 14IN2 to the battery 14B9. The leads to the other select magnets 13SEL1–9 are connected in parallel through back contacts of the associated select magnet relays 14SM1–9 to the winding of the relay 14XSM. A cross between two leads will cause the relay 14XSM to operate and apply battery to all the leads 14S0–9 to the marker 1505 except the lead 14S9 to provide a trouble indication to the marker 1505.

The crossed select magnet relay 14XSM operates to provide an indication from battery 14B9 through the indicator lamp 14IN2, the operated armature 1 of relay 14XSM, the nine normal armatures 5 of relays 14SM1–9, leads 14S1–9, cable 15C6, the line link connector 1501 and cable 15C10 to the marker 1505.

When relay 14SM9 operates it also connects ground through its operated armature 1, the operated armature 9 of relay 7C in the observation control circuit 700 and the winding of relay 7TC9 to battery 7B19 causing relay 7TC9 to operate. Relay 7C is operated as described above when the relays 8VF0, 8HG0 and 11VGB0 are operated by the marker 1505. When relay 7TC9 operates it readies a locking path to ground through its operated armature 3, switch 7SW2, lead 10 of cable 7C9, to the armature 1 of relay 13S9 in the trunk control circuit. The operation of relay 7TC9 also connects the jack 7SOJ through its operated armatures 4 and 5, switch 7SW2, leads 7 and 8 of cable 7C9 and the normal armatures 1 and 2 of relay 13TP9. When any of the relays 7TC0–9 operate, the tip lead path from lead 3TC through the serially connected armatures 1 of relays 7TC0–9 to battery 7B6 is opened to release relay 3CT in the trunk circuit 300. When relay 3CT releases it opens the connection from line 1L00 to trunk 3T0 at the concentrator C0 in order to eliminate the transmission loss that would otherwise exist. The operation of relay 7TC9 also opens the ring lead path through the serially connected armatures 2 of relays 7TC0–9.

When the marker 1505 operates the relays 14LH and 14SM9 in circuit 1400 a path is completed for operating the trunk preference relay 13TP9 in the control circuit 1300. The operating path for the relay 13TP9 is from ground at the normal armature 4 of the line busy relay 14LB through the operated armature 3 of relay 14LH, the operated armature 7 of relay 14SM9, the operated ninth armature B of relay 11VGB0 through the upper winding of relay 13TP9 to the associated battery 13B1. The operation of the trunk preference relay 13TP9 connects a positive high voltage potential source 13B5 over both sides or leads of the trunk 4T9 to the concentrator C0 through the resistors 13R9 and the operated armatures 1 and 2 of the relay 13TP9.

Each one of the trunks 4T0–9 has, as described above, associated therewith one of the trunk circuits 1T0–9 which functions to provide a connection between any one of the trunks 4T0–9 and any one of the subscribers' lines 1L00–47. The ring lead of the trunk 4T9 is connected through the resistor 1A9 to the main anode of the triode gaseous tube 1CA9 in the trunk circuit 1T9. The tip lead of the trunk 3T9 is connected to the starting anode of the tube 1CA9 which is connected to ground through the series circuit consisting of the resistor 1AA9 and the capacitor 1CC9. The main anode of tube 1CA9 is shunted to ground through the capacitor 1C9 and the cathode of tube 1CA9 is connected through the winding of the trunk relay 1TK9 to ground. The application of the positive potential from source 13B5 in the central office control circuit 1300 to trunk 4T9 causes the cold cathode tube 1CA9, which is associated as described above with the trunk 4T9, to ionize and the trunk relay 1TK9 to operate. The combination of the operation of one of the trunk relays 1TK0–9 together with one of the relays 4E0–5 and one of the relays 4U0–7 in the number group and transfer circuit 400, which were operated as described above, provides a path for operating one of the relays 1TE90–95 and one of the relays 1TU90–97 in the trunk circuit 1T9. With relays 1TK9, 4E0 and 4U0 operated, operating paths are completed for relays 1TU90 and 1TE90 in the trunk circuit 1T9. The operating path for relay 1TU90 is from ground through the operated armature 1 of relay 1TK9, the operated armature 9 of relay 4U0 and the winding of relay 1TU90 to battery 1B90 and the operating path for relay 1TE90 is from ground through the operated armature 2 of relay 1TK9, the operated armature 9 of relay 4E0 and the winding of relay 1TE90 to battery 1A90.

There is only one set of relays 4E0–5 and 4U0–7 but there are ten sets of corresponding relays in the trunk circuits 1T0–9 and one set in the trunk circuit 300. In the illustrative example described herein with the selection of the trunk 4T9 by the marker 1505, relay 1TK9 is operated and the relays 4E0 and 4U0 which indicate a subscriber's number 00 corresponding to the substation 1S00 are operated to provide a path between the selected trunk 4T9 and the calling line 1L00. The path from the tip lead 1T00 is through the operated armature 1 of relay 1TU90 in the trunk circuit 1T9, the operated armature 1 of relay ITE90 to the tip lead of the trunk 4T9 and the path from the ring lead 1R00 is through the operated armatures 2 of relays 1TU90 and 1TE90 to the ring lead of the trunk 4T9. The operation of the relays 1TU90 and 1TE90 also provides a path for operating the cut-off relay 2C00 in the line circuit 200 in series with the winding of the no-test relay 4NT9. The operating path is from ground through the winding of relay 4NT9 which is shunted by the varistor 4D13, the operated armature 6 of relay 1TU90, the operated armature 4 of the relay 1TE90 and the winding of relay 2C00 to the negative potential source 2X00. The relay 4NT9 does not operate at this time due to the effect of the varistor 4B13 which prevents it from operating upon connection to a negative source of potential. The cut-off relays 2C00–47 in the line circuit 200 are associated respectively with the subscriber lines 1L00–47 and as hereinafter described there is one no-test relay 4NTO–9 for each of the trunks 4TO–9.

When relay 2C00 operates, it releases the line identifier and lockout circuit 200 by opening the operating path for relay 2L00. When relay 2L00 releases, it in turn releases relays 2LU0 and 2LT0 and the diodes 2U0 and 2T0. When relays 2LU0 and 2LT0 release, the selective paths to the diodes 4D1–9 are opened. The relays 11A1 and 11A0 and the translator 1400 were released as described above when relays 4TR and 8TR0 operated.

When the number group relays 4E0 and 4U0 operated, a path was readied for the line busy relay 14LB, as briefly described above, by connecting the winding of relay 14LB over the control lead 4C5 to the winding of the cut-off relay 2C00 of the calling line 1L00. When the trunk circuit 1T9 is operated and ground is applied to operate the cut-off relay 2C00 the same ground is extended to and operates the line busy relay 14LB in the circuit 1400 as an indication that the line-to-trunk crosspoints are closed or that the trunk circuit 1T9 was operated. The winding of the relay 14LB which is connected to the battery 14B2 is connected through the operated armature 5 of the transfer relay 8TR0, the control lead 4C5, the operated armature 5 of the transfer relay 4TR, the operated armature 10 of the relay 4E0, the operated armature 10 of relay 4U0, the operated armature 4 of relay 1TE90, the operated armature 6 of relay 1TU90 and the diode 4D13 to ground. The operation of relay 14LB opens at its armature 4 the operating circuit described above for the trunk preference relay 13TP9 in the control circuit 1300. As described above the operating path for relay 13TP9 was through the operated ninth armature B of relay 11VGB0, the operated armature 7 of relay 14SM9, the operated armature 3 of relay 14LH through the normal armature 1 of relay 14LB to ground. When relay 13TP9 releases, it removes the source 13B5 from the trunk 4T9 causing the trunk relay 1TK9 in the trunk circuit 1T9 to release and the triode 1CA9 also in circuit 1T9 to return to normal. Relays 1TE90 and 1TU90 which were operated respectively through the operated armatures 1 and 2 of relay 1TK9 remain operated through the back contacts of the normal armatures 1 and 2 of relay 1TK9 and their respective operated locking armatures 5 and 3.

When relay 14LB in the central office connector circuit 1200 operates, it also closes a path through the lead 8LH0 from the line link connector 1501 to the winding of the sleeve relay 13S9 in the control circuit 1100 causing it to operate. The path from lead 8LH0 is through the operated armature 9 of relay 8VF0, the operated armature 5 of relay 14LB, the operated armature 1 of relay 14LH, the operated armature 4 of relay 14SM9, the operated ninth armature C of relay 11VGB0 through the winding of relay 13S9 to the associated battery 13B2. The operation of the relay 13S9 in turn causes the operation of the corresponding slow release relay 13SR9 by connecting ground through its operated armature 5 and the winding of relay 13SR9 to the associated battery 13B5. When relay 13S9 operates, it closes the link tip lead 13T9 and the link ring lead 13R9 through its operated armatures 1 and 2 and the normal armatures 1 and 2 of the relay 13TP9, respectively, to the tip lead and ring lead of the trunk 3T9 to the concentrator C0. The line hold lead 8LH0 which was extended through the operated armature 5 of relay 14LB as described above to the winding of relay 13S9 is extended therefrom through its operated armature 4 to the sleeve lead 13SL9 as an indication to the marker 1505 that the cross-points are closed. When relay 13SR9 operates, it locks to ground through its operated armature 2 and the normal armature 5 of relay 13TP9 and connects the grounded resistor 13R19 through its operated armature 3 and the operated ninth armature F of relay 11VGB0, the lead 16LL9 and cable 15C5 to the line link connector 1501.

When relay 13S9 operates it also closes locking ground through its operated armature 1, as briefly described above, to the winding of relay 7TC9.

In this manner the subscriber's line 1L00 is connected through the trunk circuit 1T9, the trunk 4T9 through the central office trunk control circuit 1300 and cable 15C7 to the trunk frame 1503. The trunk frame 1503 is connected to an originating register 1506 under control of the marker 1505 through cables 15C12 and 15C13 to provide dial tone to the line 1L00. After the marker 1505 connects the register 1506 to frame 1503 it releases and in turn releases all the relays shown in Figs. 1 through 16 except the relays 1TU90, 1TE90, 3TE0, 3TU0 and 2C00 at the concentrator C0 and the relays 13S9, 13SR9 and 7TC0 and the selected one of hold magnets 11HM0–9 in the central office which remain operated for the duration of the call. When the marker 1505 releases or disconnects it releases relays 8HG0, 8VF0, 11VGA0, 11VGP0, 14SM9 and 14LH. When relay 11VGP0 releases, it in turn releases relay 11VGB0 and when relays 8HG0 and 8VF0 release they in turn release relays 8TR0, 4TR, 4L0, 14LB, 7C, 5A+ and 5C+. When relays 5A+, 5C+ and 4L0 release, they in turn release the number group relays 4E0 and 4U0. The relays 1TU90 and 1TE90 remain operated through their locking paths and relay 2C00 remains operated through the operated armatures 6 and 4, respectively, of relays 1TU90 and 1TE90. The relays 3TU0 and 3TE0 also remain operated through their locking paths to ground at the back contacts of the normal armatures 1 and 2 of relay 3TK and relay 7TC9 remains operated to ground at armature 1 of relay 13S9. When relay 11VGB0 releases, it opens the operating path for select magnet 13SM9 which releases. The crosspoint through the frame 13LLF remains locked however under control of the operated one of the hold magnets 13HM0–9.

To briefly recapitulate the observation sequence, the jack 7SOJ which was connected to line 1L00 is disconnected at the trunk circuit 300 and connected at the trunk control circuit 1300 to the selected trunk 4T9 after the origination of a call on line 1L00.

When dial tone is received at the substation 1L00 and the called subscriber's number is dialed, it is registered in the originating register 1506. After the dialed number is recorded in the originating register 1506 the established connection between the calling line 1L00 and the originating register 1506 is released and a new connection from the calling line 1L00 to the trunk frame 1503 to the called line, not shown, is established. When dialing is completed the originating register 1506 summons a marker 1505 through cable 15C13, passes to it the information necessary to complete the call including the trunk selection 4T9, the calling line identification 00, and a record of the frame linkages used on the line-to-register connection. The marker 1505 then releases the register 1506 and proceeds to establish the line-to-trunk connection after having ascertained that a linkage therefor is available. When the register 1506 is released the sleeve ground potential therefrom through cable 15C13, trunk frame 1503, cable 15C7 and the crosspoint B of frame 13LLF is removed causing relays 13B13 and 13S9 to release. When relay 13S9 releases it in turn releases relays 13SR9 and 7TC9. The locking path for relay 7TC9, as described above, is through the operated armature 1 of relay 13S9. When relay 7TC9 releases it opens the connection from jack 7SOJ to trunk 4T9 at its armatures 4 and 5 and provides an operating path for relay 3CT in the trunk circuit 300. The operating path for relay 3CT is through the winding of relay 3CT, the varistor 3V, the tip lead 3TI of trunk 3T0, switch SW1, the resistor 7R1, the normal armature 2 of key 7DIS, the normal armature 2 of relay 7SB and the serially connected armatures 1 of relays 7TC0–9, the lamp 702 to battery 7B6. When relay 3CT operates it reestablishes the connection from line 1L00 through the trunk circuit 300 to trunk 3T0. The connection from line 1L00 to trunk 3T0 is maintained during the brief interval between the release of the frame 13LLF when the register 1506 is released to the selection of one of the trunks 14T0–9 during callback for the line-to-trunk connection. As is hereinafter described, when the marker 1505 operates the common control circuit 800 in accordance with the identity of the calling line 1L00 and the timing and connector circuit 1400 in accordance with the identity of the selected one of the trunks 4T0–9; the associated one of the relays 7T0–9 is operated to reopen the connection through the trunk circuit 300 and connect the jack 7SOJ to the newly selected one of the trunks 4T0–9 at the trunk control circuit 1300.

A call-back call in conjunction with a concentrated line, such as 1L00, is somewhat more complex than one in conjunction with a regular line not connected to a concentrator, such as concentrator C0, because of the fact that the line-to-trunk connection at the concentrator C0 is locked operated and must receive a distinct release signal in order to disconnect. This connection must be released on each call-back call because the link selected to complete the line-to-trunk connection may not be the same as that used for the register connection. The marker 1505 makes use of recorded line linkages to release the line-to-register connection at the concentrator C0 before establishing the line-to-trunk connection. When the marker 1505 is ready to establish the line-to-trunk linkage it selects the line link frame in which the concentrator C0 appears and operates through cable 15C10, connector 1501 and cable 15C2, the relays 11VGP0, 8HG0 and 8VF0 and also, as is hereinafter described, the relay 14LD9. The marker 1505 also operates the call-back relay 14CB in the circuit 1400 through cable 15C10, the line link connector 1501 and cable 1506. The operation of the call-back relay 14CB in turn energizes the timing relay 14TM by applying ground through its operated armature 3 and the serially connected normal armatures 1 of relays 14LD9–0 and the winding of relay 14TM to the battery 14B6. The timing relay 14TM functions to relay the operation of the transfer circuit 8T0 in order to prevent operating the number group relays 4E0–5 and 4U0–7 in the number group and transfer circuit 400 at the concentrator C0. The number group relays 4E0–5 and 4U0–7 must remain non-operated while the linkage in use is being released because the presence of a trunk signal is used to disconnect and the presence of a trunk signal in combination with the line number is used to connect a line-to-trunk circuit at the concentrator C0. The relay 14TM is utilized to control the length of time allowed for releasing the trunk circuit 1T9 in the concentrator C0. When the relay 14TM finally operates, it in turn causes the operation of relay 14TM1 by connecting ground through its operated armature 4 and the winding of relay 14TM1 to battery 14B7. When relay 14TM1 operates, it locks to ground through its operated armature 2 and the operated armature 1 of the call-back relay 14CB and also connects ground through its operated armature 1 and the operated armature 1 of relay 14TM through the winding of relay 14TM2 to battery 14B8 causing relay 14TM2 to operate.

When the marker 1505 has determined that there is a path available to the called line or outgoing trunk from the trunk frame 1503, it releases, as described above, the originating register 1506 and at the same time operates the disconnect relay 14LD0–9 which corresponds with the link or trunk 4T0–9 that was used on the line-to-register connection. In the illustrative example described above, trunk 3T9 was utilized so that relay 14LD9 is operated over a path from the winding thereof through cable 15C6, the line link connector 1501 and cable 15C10 to battery, not shown, in marker 1505. When relay 14LD9 operates, it causes the linkage from the line 1L00 to the orginating register to be disconnected or open at the concentrator C0. When relay 14LD9 operates, it opens at its armature 1 the operating path for the slow release timing relay 14TM and closes an operating path for relay 13TP9 in the trunk control circuit 1300. The operating path for relay 13TP9 is from ground through the operated armature 3 of relay 14TM, which has not as yet released, the operated armature 2 of relay 14LD9, the operated ninth armature B of relay 11VGB0 which operated under control of relay 11VGP0, the winding of relay 13TP9 to the associated battery 13B1. When relay 13TP9 operates, it applies the positive potential source 13B5 through resistors 13R9 and the operated armatures 1 and 2 of relay 13TP9 to the trunk 4T9 causing the ionization of the tube 1CA9 and the operation of the trunk relay 1TK9 in the trunk circuit 1T9 in a similar manner as described above for establishing the connection from the subscriber's line 1L00 to the originating register 1506. With the number group relays 4E0–5 and 4U0–7 remaining normal the operation of the trunk relay 1TK9 removes ground from the windings of relays 1TE90 and 1TU90 causing them to release and to open the connection from the line 1L00 to the trunk 4T9. The relay 2C00 which is slow to release does not release but remains operated during the time it takes to reoperate one of the trunk circuits 1T0–9 to establish a link-to-outgoing trunk connection.

At the end of the timed interval the relay 14TM in circuit 1400 releases to in turn release the relay 13TP9, the operating path of which as described above was through the operated armature 3 of relay 14TM. When relay 13TP9 releases, it removes the disconnect potential from trunk 4T9 and opens the operating path at its armature 1 for the relay 14TM2 causing it to release. Relay 14TM2 is also a slow-to-release relay in order to allow sufficient time for the trunk relay 1TK9 in the trunk circuit 1T9 to release. When the relay 14TM2 finally releases, with relay 14TM1 still locked operated, a circuit is completed for operating the relay 8TR0 in the transfer circuit 8T0 and the transfer relay 4TR in the number group and transfer circuit 400 to permit connecting the subscriber's line 1L00 to one of the trunks 4T0–9 as selected by the marker 1505 in a similar manner as described above for establishing the line-to-register connection. The operating path is from battery 10B1 through a resistor 10R, the operated armature 1 of relay 8VF0, the operated armature 3 of relay 8HG0, the operated armature 3 of relay 14TM1, the normal armature 1 of relay 14TM2, the normal armature 2 of relay 14TM, the operated armature 7 of relay 11VGB0, the winding of relay 8TR0, control lead 4C6, the winding of relay 4TR, diode 4D11 shunting the winding of relay 4H1, the winding of relay 4L0 and the normal armature 3 of relay 4NTA to ground. Relays 8TR0, 4TR and 4L0 are in this manner operated. With the transfer relays 8TR0 and 4TR being operated, coded signals representing the identity of the calling line 1L00 are sent under control of the control circuit 800 in a similar manner as described above for establishing a line-to-register connection to operate the translator circuit 500. Relays 5A+ and 5C+ are operated in the translator circuit 500 to register the number 00, in accordance with the chart shown in Fig. 21, which corresponds to the calling subscriber and in turn cause the operation of the number group relays 4E0 and 4U0.

When relays 8HG0, 8VF0 and 11VGB0 operate they in turn provide an operating path for relay 7C in the observation control circuit 700. The operating path for relay 7C is from ground through the operated armature 17 of relay 8HG0, the operated key 7H0, the winding of relay 7C, switch 7SW2, lead 3 of cable 7C0, the operated armature 1 of relay 11VGB0, lead 2 of cable 7C0, the operated key 7V0, and the operated armature 11 of relay 8VF0 to battery 8A0. When relay 7C operates it readies operating paths for the relays 7TC0–9.

Assume for example that trunk 4T0 is selected by the marker 1505. At the same time that the marker 1505 operated the relays 8HG0, 8VF0, etc., the marker 1505 also operates the relays 14SM0 and 14LH which in turn cause the operation of relays 7TC0 and 13TP0. When relay 14SM0 operates it in turn operates relay 7TC0 from ground through the operated armature 1 of relay 14SM0 and the operated armature 0 of relay 7C. When relay 7TC0 operates it opens the operating path, described above, for relay 3CT to open the connection from line 1L00 to trunk 3T0 at the concentrator C0 and also connects the jack 7SOJ to the trunk 4T0 through the armatures 1 and 2 of relay 13TP0. When relay 13TP0 operates, it applies an operating potential from battery 13B1 through resistor 13R0 and the operated armatures 1 and 2 of relay 13TP0 to the trunk 4T0 to cause tube 1CA0 to ionize and the trunk relay 1TK0 to operate. The operation of the relays 4E0, 4U0 and 1TK0 together form operating paths for the relays 1TU00 and 1TE00 in the trunk circuit 1T0 to provide a connection between the line 1L00 through trunk 4T0 to the central office. The operating path for relay 1TU00 is from ground through the operated armature 1 of relay 1TK0, the operated armature 0 of relay 4U0 and the winding of relay 1TU00 to battery 1B00. The operating path for relay 1TE00 is from ground through the operated armature 2 of relay 1TK0, the operated armature 0 of relay 4E0, and the winding of relay 1TE00 to battery 1A00. When relays 1TU00 and 1TE00 operate they provide a path through their operated armatures 1 and 2 from line 1L00 to trunk 4T0 and also provide another operating path for relay 2C00 from ground through the diode 4D12, the operated armature 6 of relay 1TU00, the operated armature 4 of relay 1TE00, and the winding of relay 2C00 to battery 2X00. The diode 4D12 which shunts the relay 3NT0 prevents it from operating at this time.

When relays 1TU00 and 1TE00 operate, an operating ground is also provided to the winding of relay 14LB through the diode 4D12, the operated armature 6 of relay 1TU00, the operated armature 4 of relay 1TE00, the operated armatures 10 of relays 4U0 and 4E0, the operated armature 5 of relay 4TR, the control lead 4C5, and the operated armature 5 of relay 8TR0. When relay 14LB operates it opens at its armature 1 the operating path for relay 13TP0 causing it to release and remove the connect potential from trunk 4T0. When the connect potential is removed, relay 1TK0 releases and tube 1CA0 deionizes. Relays 1TU00 and 1TE00 remain operated from ground through the contacts of the normal armature of relay 1TK0. When relay 14LB operates, it also closes a path from lead 8LH0 through the operated armature 9 of relay 8VF0, the operated armature 5 of relay 14LB, the operated armature 1 of relay 14LH, the operated armature 4 of relay 14SM0, the operated 0 armature C of relay 11VGB0 through the winding of relay 13S0 to the associated battery 13B2 causing relay 13S0 to operate. When relay 13S0 operates, it in turn operates the slow release relay 13SR0 and closes the link tip lead 13T0 and the link ring lead 13R0 through its operated armatures 1 and 2 and the normal armatures 1 and 2 of relay 13TP0, respectively, to the trunk 4T0. When relay 13S0 operates, it also extends its operating ground path through its operated armature 3 to the sleeve lead 13SL0 and when relay 13SR0 operates, it connects the grounded resistor 13R10 through its operated armature 3, the operated 0 armature F of relay 11VGB0, lead 16LL0 through cable 15C5 to the connector 1501. When relay 13S0 operates it also provides locking ground to the relay 7TC0 in the observation control circuit 700 in a manner described above for relay 11S9.

When the marker 1505 receives the indication of crosspoint closure by the sleeve ground through the trunk frame 1503 it operates the trunk frame 1503 to connect an outgoing trunk, not shown, through the tip and ring links 13T0 and 13R0 and trunk 4T0 to the concentrator C0. In this manner the line 1L00 is connected through trunk circuit 1T0, trunk 4T0, circuit 1300, cable 15C7, and the trunk frame 1503 to an outgoing trunk.

When the connection from line 1L00 to outgoing trunk is completed as evidenced by the grounded sleeve link 13SL0 and an indication from the trunk frame 1503, the marker 1505 disconnects from the line and trunk frames. When the marker 1505 releases, it releases relays 8HG0, 8VF0, 11VGA0, 11VGP0, 14SM0, 14LH and 14CB. When relay 11VGP0 releases, it in turn releases relay 11VGB0 and when relay 14CB releases, it releases relay 14TM1. When relays 8HG0 and 8VF0 release they in turn release relays 7C, 8TR0, 4TR, 4L0, 14LB, 5A+ and 5C+ and when relays 5A+ and 5C+ release they in turn release the number group relays 4E0 and 4U0. The realys 1TU00 and 1TE00 remain operated from ground at the normal armatures of relay 1TK0 and relays 3TU0 and 3TE0 remain operated from ground at the normal armatures of relay 3TK. When relay 11VGB0 releases, it in turn releases the select magnet 13SM0 but the crosspoint A in the frame 13LLF remains closed under control of the operated one of the hold magnets 13HM0. Only the relays 1TU00, 1TE00, 3TU0, 3TE0 and 2C00 are operated in the concentrator C0 and the relays 13S0, 13SR0, 7TC0 and the hold magnets 11HM0 are operated in the central office concentrator control 290.

*Disconnect*

When the calling or the called subscriber hangs up, ground is removed from the sleeve lead 13SL0 of the switching circuit 13LLF by the trunk frame 1503 allowing the sleeve relay 13S0 to release. If there is no call in progress in the concentrator C0 the associated preference relay 13TP0 is operated over a path from ground through the normal armature 4 of relay 13S0, the operated armature 1 of relay 13SR0, the lower winding of relay 13TP0, the normal armature 1 of relay 11VGP0, the normal armature 1 of relay 11VGP9 to battery 12B in signal circuit 11SIG9 causing relay 13TP0 to operate. When relay 13TP0 operates, it applies the battery 13B10 through the resistors 13R0 to the tip and ring of the trunk 4T0 and also opens the locking circuit of relay 13SR0 at armature 5 of relay 13TP0 allowing it to release. The application of a positive potential to the trunk 4T0 causes the ionization of tube 1CA0 and the operation of relay 1TK0 which removes locking ground from relays 1TE00 and 1TU00. When relays 1TE00 and 1TU00 release, they in turn cause the release of relay 2C00.

When relay 13S0 releases it also opens the locking path for relay 7TC0 causing it to release. When relay 7TC0 releases it reestablishes the operating path for relay 3CT to reconnect the line 1L00 to trunk 3T0 and also opens the path from jack 7SOJ to trunk 4T0. The ring lead 1R00 of line 1L00 is in this manner reconnected through circuit 300 and the ring lead 3R1 of trunk 3T0 to the jack 7SOJ in order to provide an indication of another service request on line 1L00.

When the slow release relay 13SR0 releases, it in turn releases the relay 13TP0 which removes the disconnect potential source 13B10 from the trunk 4T0 to release relay 1TK0 and deionize tube 1CA0 returning concentrator C0 to normal.

If a call is in progress at the concentrator C0 when either the called or calling subscriber disconnects, the relay 13SR0 locks operated through the back contact of armature 5 of relay 13TP0 which cannot operate until the existing call is served. If another call is being served by the concentrator C0, relay 11VGP0 is operated and the operating paths for relays 13TP0–9 are open at armature 1 thereof. In the meantime the linkage through trunk 4T0 is held busy over the line link lead 16LL0 which is grounded through the contacts of relay 13SR0. When relay 13VGB0 releases after the other call is serviced, relay 13TP0 operates to complete the disconnect sequence described above. It is necessary, as described above, that facilities be available at the central office to record the existence of a call on trunk 4T0, to recognize a disconnect and to send a disconnect potential over trunk 4T0. Moreover since the disconnect equipment is utilized in common by terminating calls and by disconnect, it is necessary to provide a lockout between the two types of usage. This is accomplished as described above by the relays 13TP0–9 and the preference relays 11VGP0–9. If any one of the relays 11VGP0–9 is operated, the operation of relays 13TP0–9 during disconnect is delayed and if any one of relays 13TP0–9 is operated, the operation of relays 11VGB0–9 is delayed.

The concentrator system of the present invention incorporates the dial-tone lockout feature of the No. 5 crossbar system described in the above-identified patent to Busch wherein a dial-tone call will not be started if a call is being served in the control 290. Also if a terminating call to the same concentrator C0–9 obtains possession of the control 290 after a dial-tone call is started and operates one of the relays 11VGB0–9 before dial-tone call progresses to operate one of the trunk preference relays 13TP0–9, the request for the dial-tone marker 1505 will be canceled. This results from the fact that common signal leads are utilized and are given preference for use on terminating calls as described above.

*Terminating call*

In order that mutual lockout due to common usage of signaling leads may not exist between originating and terminating calls that occur simultaneously within the same concentrator separate originating and terminating control equipment is used at the central office. Also all calls are treated as terminating calls when establishing the connection at the concentrators C0–9. Transmission of information from the concentrators C0–9 is limited to passing the calling line number which is registered by the marker 1505. Thereafter the call is treated as a terminating call. A terminating call to concentrator lines 1S00–47, 6S00–47, etc. is completed by the marker 1505 in a manner very similar to that described above for establishing a line-to-register or line-to-trunk connection for an originating call. The marker 1505 operates one of the relays 11VGB0–9 under control of the associated one of the relays 11VGB0–9, one of the horizontal group relays 8HG0–9 and one of the vertical file relays 8VF0–4 which complete a circuit for operating the transfer relays 8TR0 and 4TR. The line number is then transmitted to the concentrator C0 and the number group relays 4E0–5 and 4U0–7 are operated as described above. The operation of the number group and transfer circuit 400 connects the line busy relay 14LB in the circuit 1400 to the winding of one of the cut-off relays 2C00–47 that is associated with the called one of lines 1L00–47. If the called line is line 1L00, for example, and it is busy, the associated cut-off relay 2C00 is operated and relay 14LB connected thereto operates as well. The operation of the relay 14LB opens the circuit to the line hold relay 14LH and returns ground over the leads 8LH0–4 corresponding in number to that of the operated one of the vertical file relays 8VF0–4, to the marker 1505. This indicates to the marker 1505 that the line is busy. The marker 1505 thereupon dismisses the control 290 and the concentrator C0 and proceeds to return the line busy tone to the calling subscriber.

If the called line is idle the line busy relay 14LB remains non-operated. After waiting a predetermined interval normally required to permit the hold relay 14LH to release and the select magnet fingers to stop vibrating in case the line just became idle, the marker 1505 applies ground for operating the line hold relay 14LH. During this time delay the marker 1505 applies battery to operate a selected one of the relays 14SM0–9 which is associated with the selected idle links 4T0–9. If trunk 4T9 is selected relay 12SM9 is operated and in turn operates its associated select magnets 11SEL9 on the frame 13LLF and in conjunction with the operated line hold relay 14LH applies positive battery over the selected trunk towards the concentrator C0. This operates the associated trunk relays 1TK9 and closes the cross-points or operates the trunk circuits 1T9 in a similar manner as described above for an originating call. In general, therefore, the sequence of operations for a terminating call is quite similar to that of a call-back call.

Except for the provision of a visual indication to the observation operator the observation control circuit 700 functions in a manner similar to that described above. When relays 8HG0, 8VF0 and 11VGB0 are operated an operating path is provided for relay 7C which readies operating paths for relays 7TC0–9. When relay 14SM9 operates it in turn operates relay 7TC9 to connect jack 7SOJ to trunk 4T9 and to cause the operation of relay 3CT. Relay 3CT opens the connection from line 1L00 to trunk 3T0. It is necessary to operate relay 3CT for a terminating call in order to prevent the provision of a visual indication to the operator by energizing lamp 7L2 when the subscriber at station 1S00 responds to the ringing tone. In this manner the circuit 700 distinguishes between originating calls and terminating calls.

*No-test and class of service*

Class of service is provided on a per line basis as indicated in the control circuit 1300. A cross-connection may be made from any one of the 48 line terminals 0–47 for each of the concentrators C0–9 to any one of the 30 class-of-service terminals marked 0–29. Each such class of service, as is well known in the art, identifies the type of line, such as flat rate, message rate, etc.

No-test calls provide direct access to the subscriber lines 1L00–47 whether they are idle or busy for testing or for operator verification. No-test calls to idle lines are completed in a similar manner as terminating calls described above with the addition that the no-test relay 14NT is operated by the marker 1505. On no-test calls to busy lines the call proceeds as a terminating call up to the point where a line busy test is made. The relay 14LB operates and in conjunction with the relay 14NT locks to +130 volt battery 14B4 and applies +130 volts to lead 4C5 to the concentrator C0. Battery 14B4 is connected through lamp 14IN1, the normal armature 4 of relay 14LH, the operated armature 3 of relay 14NT, the operated armature 8 of relay 14LB, resistor 14R2 and the winding of relay 14LB to battery 14B2 and from the operated armature 8 of relay 14LB through the operated armature 7 of relay 14LB, the operated armature 2 of relay 14NT, the operated armature 5 of relay 11VGB0 to the lead 4C5. The circuit is extended in the concentrator C0 through the operated armature 5 of relay 4TR to the armatures 10 of relays 4E0–5. Suppose for example the no-test call is for line 1L00 and therefore the number group relays 4E0 and 4U0 are operated. The path from lead 4C5 is then extended through the operated armature 10 of relay 4E0, the operated armature 10 of relay 4U0 to the winding of relay 2C00 and also through the operated one of the trunk circuits 1T0–9 to the winding of the associated one of the no-test relays 4NT0–9. If trunk 4T0 is the busy trunk for line 1L00 the connection is through the operated armature 4 of relay 1TE00 and the operated armature 6 of relay 1TU00 to the grounded winding of relay 4NT0. Relay 2C00 remains operated and relay 4NT0 is operated by the positive potential from the central office. The relay 4NT0 operates and closes a ground through its armature 4 to operate the relay 4NTA and also closes ground to selected ones of the control leads 4C2–4 preparatory to transmitting the identity of the trunk number in a two-out-of-five code to the central office. Relay 4NTA, which is connected to battery 4B20, operates and releases any operated relays in the line lockout and identifier circuit 201 by disconnecting battery 4B18 at its armature 1 and opens the transfer circuit through the control lead 4C6 at its armature 3. When the transfer circuit through control lead 4C6 is opened, relays 4L0, 4TR and 8TR0 release. Relay 4NT0 which was operated as described above over a path through the operated armatures 5 of relays 8TR0 and 4TR does not release but remains operated through a locking path from the operated armature 3 of relay 4NT0, control lead 4C5, the operated armature 5 of relay 11VGB0, the operated armature 2 of relay 14NT, the operated armatures 7 and 8 of relay 14LB, the operated armature 3 of relay 14NT, the normal armature 4 of relay 14LH, and lamp 14IN1 to battery 14B4. When the relay 8TR0 in the transfer circuit 8T0 releases, the no-test transfer relay 11NTR0 in the signal circuit 11SIG0 operates and transfers the control leads 4C2–4 to the two-out-of-five no-test relays 16NT0, 16NT1, 16NT2, 16NT4 and 16NT7 which record the number of the line link or trunk 4T0 as transmitted from the concentrator C0. The operating path for relay 11NTR0 is from ground through the operated armature 4 of relay 14NT, the operated armature 9 of relay 14LB, the operated armature 4 of relay 11VGB0, the normal armature 6 of relay 8TR0, and the winding of relay 11NTR0 to battery 11B1. When relay 11NTR0 operates, it transfers the leads 4C2–4 to the windings of relays 16NT0, 16NT1, 16NT2, 16NT4 and 16NT7 in the translator circuit 1600. The windings of relays 16NT0 and 16NT1 are shunted by the diode network 16D3 and the relays 16NT2 and 16NT3 by the diode network 16D4 which are similar to the diode network 16D1 described above. Relay 16NT7 is shunted by diode 16V6 and connected in series with the diode 16V5. Each of the relays 16NT0, 16NT1, 16NT2, 16NT4 and 16NT7 are also connected to the alternating-current source 16AC2.

When relay 4NT0 in the concentrator C0 operated, as briefly described above, it connected ground through its operated armatures 1 and 2 to the diodes 4D2 and 4D4 so that when relay 11NTR0 operates operating paths are provided for the relays 16NT7 and 16NT4. The operating path for relay 16NT7 is from source 16AC2, through the winding of relay 16NT7, the diode 16V5, the operated armature 3 of relay 11NTR0, the normal armature 4 of relay 8TR0, lead 4C4, the normal armature 4 of relay 4TR, diode 4D2, and the operated armature 2 of relay 4NT0 to ground. The operating path for relay 16NT4 is from source 16AC2, the winding of relay 16NT4, diode 16V4 of network 16D4, the operated armature 2 of relay 11NTR0, the normal armature 3 of relay 8TR0, lead 4C3, the normal armature 3 of relay 4TR, diode 4D4, and the operated armature 1 of relay 4NTO to ground. The signal or operating ground for the no-test relays in the translator 1600 is provided by the operation of the relays 11NT0–9 in accordance with the chart shown in Fig. 22. For a 0 indication, relay 4NT0 as described above operates relays 16NT4 and 16NT7.

The operation of two out of five of the no-test relays in the translator 1600 translates the signals supplied by the concentrator C0 to a decimal indication which is supplied to the marker 1505. When the marker 1505 received the line busy indication described above it applied a positive potential of approximately 10 volts to the lead 8LH0. When relays 16NT4 and 16NT7 in the translator operate, the 10 volts on lead 8LH0 is connected through the operated armature 9 of relay 8VF0, the operated armature 5 of relay 14LB, the normal armature 1 of relay 14LH grounded by resistor 14R1 through the normal armature of relay 16NT0, the normal armature 2 of relay 16NT1, the normal armature 1 of relay 16NT2, the operated armature of relay 16NT4, the operated armature 2 of relay 16NT7, lead 16LL0 through cable 15C5 to the connector 1501 and therefrom through cable 15C10 to the marker 1505.

When the marker 1505 receives the identification of the busy trunk 4T0 it operates the no-test connector 1504 through cable 15C14 to connect it through cable 15C8 to the trunk control circuit 1300 in the signal circuit 11SIG0. The connector 1504 applies ground through cable 15C8, lead 13H, the back contact of the normal armature of relay 14NTH, the operated armature 1 of relay 14NT, the operated armature 1 of relay 14SM0, the 0 armature A of relay 11GB0, and the winding 13NTC0 to its associated battery 13B3 causing relay 13NTC0 to operate. When relay 13NTC0 operates, it connects the link leads 13T0, 13R0 and 13SL0 directly through leads 13T, 13R and 13S in cable 15C8 to the no-test connector circuit 1504. The no-test connection through cable 15C8 is in this manner bridged across the line-to-trunk connection from line 1L00 through trunk 4T0, the frame 13LLF and cable 15C7 to the trunk frame 1503. When relay 13NTC0 operates, it also causes the operation of the relay 14NTH by extending its operating path through its operated armature 4 to the winding of relay 14NTH. When relay 14NTH operates, it locks to ground through lead 13H, extends its locking ground for the relay 13NTCO and prevents the other no-test connector relays 13NTC1–9 from being operated while the no-test connector 1504 is in use by operating their operating paths through the normal back contact of relay 14NTH. The relay 14NTH in this manner locks the relay 13NTCO to the no-test connector 1504 under control of the latter circuit and independently of the line link control circuit 1300 or the connector circuit 1400. The marker 1505 disconnects from the connector 1504 a predetermined interval after connecting it to the trunk 4T0. When the marker disconnects it releases relays 14SM0, 14NT, 8VF0, 8HG0 and 11VGP0. When relay 11VGP0 releases it in turn releases relay 11VGP0 and when relay 14NT releases it removes the source 14B4 from lead 4C5 allowing relay 4NT0 to release. When relay 4NT0 releases it removes the signaling grounds to release relays 16NT4 and 16NT7 in the translator circuit 1600. When relay 11VGB0 releases it opens the operating path for relay 11NTR0 causing it to release. When relays 8VF0 and 8HG0 release the operating path for relay 14LB is opened causing it to release. Only the relays 2C00, 1TE00, 1TU00, 3TU0 and 3TE0 in concentrator C0 and relays 13NTC0, 13S0 and 13SR0, and the hold magnets 11HM9 in the central office remain operated. The relay 13NTC0 as described above is held operated under control of the connector 1504 and the other relays remain operated until disconnect also as described above.

During the no-test sequence of operations the observation control circuit 700 functioned in a manner similar to that described above for a terminating call. When the no-test call was made and line 1L00 was busy, relay 7TC9 was locked to ground through armature 1 of relay 13S9 so that the connection from line 1L00 to trunk 3T0 was open at trunk circuit 300 and jack 7SOJ was connected to trunk 4T9. If line 1L00 was not busy, the operation of relays 8HG0, 8VF0 and 11VGB0 as described above operates relay 7C to ready operating paths for relays 7TC0–9. When one of the trunks 4T0–9 is selected the corresponding one of relays 7TC0–9 is operated to open the observation trunk connection at the concentrator C0 and to connect jack 7SOJ to the selected one of trunks 4T0–9.

*Observation disconnect*

When the observation operator wishes to discontinue the observation on line 1L00 the disconnect key 7DIS is operated and keys 7V0 and 7H0 are released. When key 7DIS is operated it connects the battery 7B1 through lamp 7L, the operated armatures 2 and 1 of key 7DIS, resistors 7R1 and 7R2 and switch 7SW1 to trunk 3T0. The positive potential from battery 7B1 is connected through trunk 3T0 and resistors 3R2 and 3R3 to the starting and main anodes of tube 3CC causing it to ionize and relay 3TK connected to its cathode to operate. When relay 3TK operates it removes locking ground from relays 3TU0 and 3TE0 causing them to release. When the key 7DIS is released the tube 3CC deionizes and relay 3TR releases returning the trunk circuit 300 to normal.

It is to be understood that the above-described arrangements are illustrative of the application of the principles of this invention. For example, more than one observation control circuit 700 may be provided in the central office with each of the trunks 3T0–9 being connected to each of the circuits 300. Observation on a plurality of lines, each terminating at a different one of the concentrators C0–9, may be simultaneously effected. More than one trunk 3T0 may be provided for concentrator C0 and the number of trunks 4T0–9 and lines 1L00–47 may be varied. It is evident, therefore, that numerous arrangements may be devised by those skilled in the art without departing from the spirit and scope of the invention.

What is claimed is:

1. A service observing circuit for a line concentrator system which utilizes relatively few talking trunks for connecting a central office with a concentrator servicing relatively many subscriber lines, comprising an observation trunk; a switching network at said concentrator for connecting said observation trunk with any one of said lines; selector means at said central office connected to said observation trunk for controlling said network; observation indicating means at said central office; means responsive to the calling condition of any selected one of said lines for connecting an idle one of said talking trunks to said calling line at said concentrator and to said indicating means at said central office; and disconnect means controlled by said connecting means for disconnecting at said concentrator said observation trunk during the connection of said talking trunk.

2. A service observing circuit in accordance with claim 1 wherein said selector means includes means for signaling the identity of one of said lines to said concentrator network, means responsive to said signaling means for determining the condition of said line, and means controlled by said determining means for supplying a connect potential to said observation trunk.

3. A service observing circuit in accordance with claim 2 wherein said concentrator network includes means responsive upon the simultaneous application thereto of signals from said signaling means and a connect potential from said supply means for providing a connection between said observation trunk and said line as identified by said signals.

4. In a telephone service observing system a normally open line, a service observing trunk having one lead connectable to said line, a service observing jack normally connected to said one lead of said trunk, a line concentrator for connecting said line to said observing trunk, selector means associated with said observing jack for controlling the operation of said line concentrator, means responsive to a calling condition on said line for causing said line concentrator to disconnect said one lead from said line, at least one talking trunk connected to said line concentrator, and means responsive to a calling condition on said line for connecting said jack to said talking trunk.

5. In combination with a plurality of subscriber lines terminating at a line concentrator which is connected by a plurality of talking trunks to a telephone central office, an observation trunk connected to said line concentrator, means at said concentrator for connecting said observation trunk to any one of said lines, selector means at said central office for controlling the operation of said connecting means, and means operative in response to the initiation of a call on an observed one of said lines as determined by said selector means for causing said connecting means to release the connection between said observed calling line and said observation trunk.

6. The combination in accordance with claim 5 in combination with observation switchboard means at said central office normally connected to said observation trunk, and means operative in response to the initiation of a call on said observed line for selecting one of said talking trunks for the call and for connecting said selected trunk to said observation switchboard means.

7. The combination in accordance with claim 6 wherein said selector means includes means for signaling the identity of the selected line to said concentrator and wherein said connecting means includes receiving and translating means controlled by the signals from said signaling means.

8. The combination in accordance with claim 7 wherein said selector means comprises in addition means operative substantially at the same time as said signaling means for supplying a connect potential over said observing trunk to said connecting means.

9. The combination in accordance with claim 8 in combination with disconnect means including means for supplying said connect potential over said observing trunk while inhibiting the operation of said signaling means.

10. A system for service observing telephone subscriber lines terminating at automatically operating satellite offices that are each connected to a central office by a plurality of talking trunks comprising an observation trunk for each of said satellite offices, a service observing position at said central office, means at said observing position for selecting any one of said satellite offices and any one of said lines terminating at said selected satellite office, means at said observing position controlled by said selecting means for transmitting the identity of said selected line to said selected satellite office, and means at each of said satellite offices controlled by said transmitting means for establishing a connection between any one of said subscriber lines terminating thereat and the associated one of said observation trunks.

11. A system in accordance with claim 10 comprising in addition means responsive to the initiation of a calling condition on said selected line for causing said connecting means to release the connection to said observation trunk and for selecting an idle one of said plurality of talking trunks connected to said selected satellite office, and means at said observing position responsive upon the selection of one of said talking trunks by said releasing and selecting means for establishing a connection from said observing position to said selected talking trunk.

12. A system in accordance with claim 10 comprising in addition means responsive to the initiation of a calling condition on said selected line for providing through said connected observation trunk a visual indication of the initiation of the calling condition to said observing position, and means responsive upon the operation of said indication means for disconnecting said selected line from said observation trunk at said selected satellite office.

13. A telephone system comprising a large plurality of subscriber lines arranged in groups, a small plurality of talking trunks arranged in groups, a line concentrator for each of said groups of lines for establishing a connection from any one of said lines in said groups of lines to any one of said trunks in one of said groups of trunks, a service observing position including means for selecting any one of said line concentrators and any one of said lines connected to said selected line concentrator, a service observing trunk for each of said line concentrators and connected to said service observing position, means at said observing position controlled by said selecting means for supplying to said selected line concentrator a coded representation of the identity of said selected line, means at each of said line concentrators for registering said signals from said signal supply means, means controlled by said registering means for making a line busy test of said selected line, means at said service observing position controlled by said line busy testing means when said selected line is idle for supplying a connect potential over said observing trunk connected to said selected line concentrator, and connecting means at said selected line concentrator controlled by said registering means and by said connect potential supply means for establishing a connection from said selected line to said observing trunk connecting said selected line concentrator to said service observing position.

14. A telephone system in accordance with claim 13 comprising in addition means responsive to the initiation of a calling condition on said selected line for supplying an indication thereof over said observing trunk and for supplying a coded representation of the identity of said calling line to said service observing position, means at said service observing position and connected to said service observing trunk for providing a visual indication of the initiation of the calling condition on said selected line, means at said service observing position for registering said coded signals from said line concentrator, means controlled by said registering means at said position for selecting an idle one of said trunks in said group of trunks connecting said selected line concentrator with said service observing position, jack means at said service observing position, and means at said service observing position responsive to the operation of said talking trunk selecting means for disconnecting at said line concentrator said selected line from said service observing trunk and for establishing a connection from said jack means to said selected talking trunk.

15. A telephone system in accordance with claim 14 comprising in addition means responsive upon the termination of a call on said selected line for releasing the connection from said jack means to said selected talking trunk and for controlling said connecting means at said selected line concentrator to reestablish the connection from said observing trunk to said selected line.

16. A telephone system in accordance with claim 15 comprising in addition disconnect means including means for initiating the operation of said connect potential supply means, and means for inhibiting the operation of said coded signal supply means at said service observing position, and means at said selected line concentrator responsive to the operation of said disconnect means for controlling said connect means at said selected line concentrator to release the connection from said selected line to said service observing trunk.

17. A line observation circuit for a line concentrator telephone system which has a plurality of subscriber lines terminating at each of a plurality of line concentrators comprising a common observation control circuit having selector means for selecting any one of said concentrators and any one of said lines terminating at said selected concentrator and having connect control means; an observation trunk for each of said concentrators connected to said control circuit; a concentrator observation trunk circuit for each of said trunks for establishing a connection from said selected line to the associated one of said observation trunks under control of said connect control means; means responsive to the initiation of a calling condition on said selected line for providing a visual indication thereof at said observation control circuit; and means responsive during the busy condition of said line for disconnecting said selected line from said associated trunk.

18. In combination a line concentrator; a plurality of subscriber lines connected to said concentrator; a central office; a plurality of talking trunks connecting said concentrator to said central office; an observation position at said central office; an observation trunk connecting said concentrator with said observation position; means for selecting one of said lines and for connecting said observation trunk to said selected line; means for selecting any one of said talking trunks, means responsive upon the selection of one of said talking trunks for said selected line for disconnecting said observation trunk from said selected line and for connecting said observation position to said selected talking trunk; and means responsive to the initiation of a calling condition on said selected line for providing a visual indication thereof at said observation position.

References Cited in the file of this patent

UNITED STATES PATENTS

| | | |
|---|---|---|
| 2,457,046 | Kucera | Dec. 21, 1948 |
| 2,709,722 | Rosene | May 31, 1955 |
| 2,715,656 | Andrews | Aug. 16, 1955 |
| 2,724,744 | Brewer et al. | Nov. 22, 1955 |